United States Patent
Ogura

(10) Patent No.: US 7,339,872 B2
(45) Date of Patent: Mar. 4, 2008

(54) OPTICAL DISC DEVICE

(75) Inventor: Youichi Ogura, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 574 days.

(21) Appl. No.: 10/942,949

(22) Filed: Sep. 17, 2004

(65) Prior Publication Data

US 2005/0063276 A1 Mar. 24, 2005

(30) Foreign Application Priority Data

Sep. 19, 2003 (JP) ............... 2003-328804

(51) Int. Cl.
*G11B 5/09* (2006.01)
(52) U.S. Cl. ............... 369/59.22; 369/59.11; 369/59.1
(58) Field of Classification Search ............ None
See application file for complete search history.

(56) References Cited

U.S. PATENT DOCUMENTS 6,483,793 B1 * 11/2002 Kim .................. 369/59.22
7,194,674 B2 * 3/2007 Okumura et al. ......... 714/795

FOREIGN PATENT DOCUMENTS

| JP | 2000-123487 | 4/2000 |
| JP | 2002-008315 | 1/2002 |
| JP | 2002-269925 | 9/2002 |

\* cited by examiner

*Primary Examiner*—Muhammad Edun
(74) *Attorney, Agent, or Firm*—Wenderoth, Lind & Ponack, L.L.P.

(57) ABSTRACT

An optical disc device of the present invention obtains a reproduction quality that is independent of a mark distortion by receiving a signal that is obtained from an A/D converter for digitizing a reproduction signal of an optical disc medium and an offset correction means for performing offset correction, accurately measuring a mark distortion factor in a mark pattern having a long recording width by means of a mark distortion factor measuring means, and selecting one of output signals from a PRML signal processing means and a level judge binarization means by means of a digital data demodulation selection means by utilizing the measured mark distortion factor as a judgement criterion, to be used as a demodulation binary signal.

23 Claims, 25 Drawing Sheets

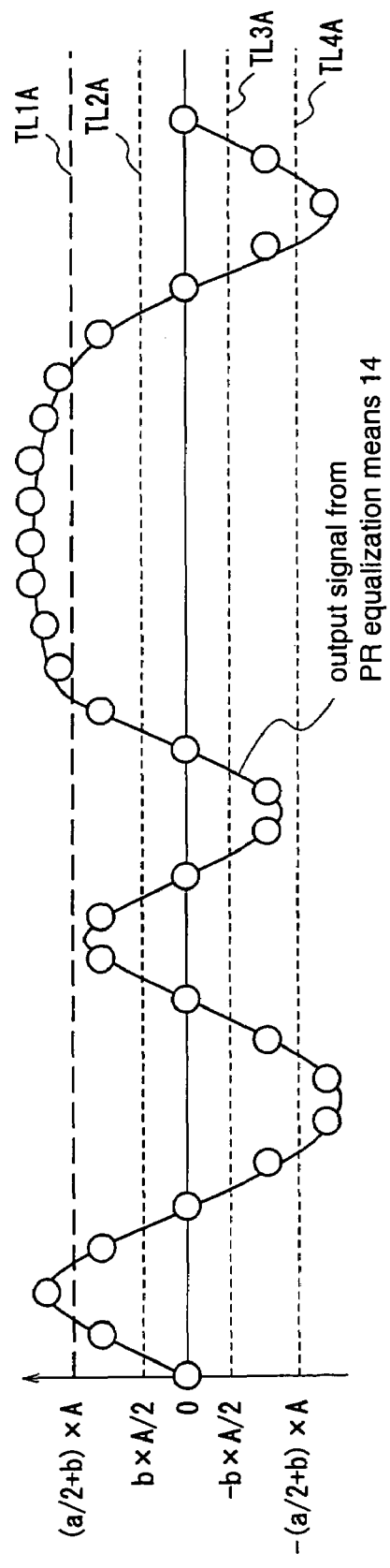

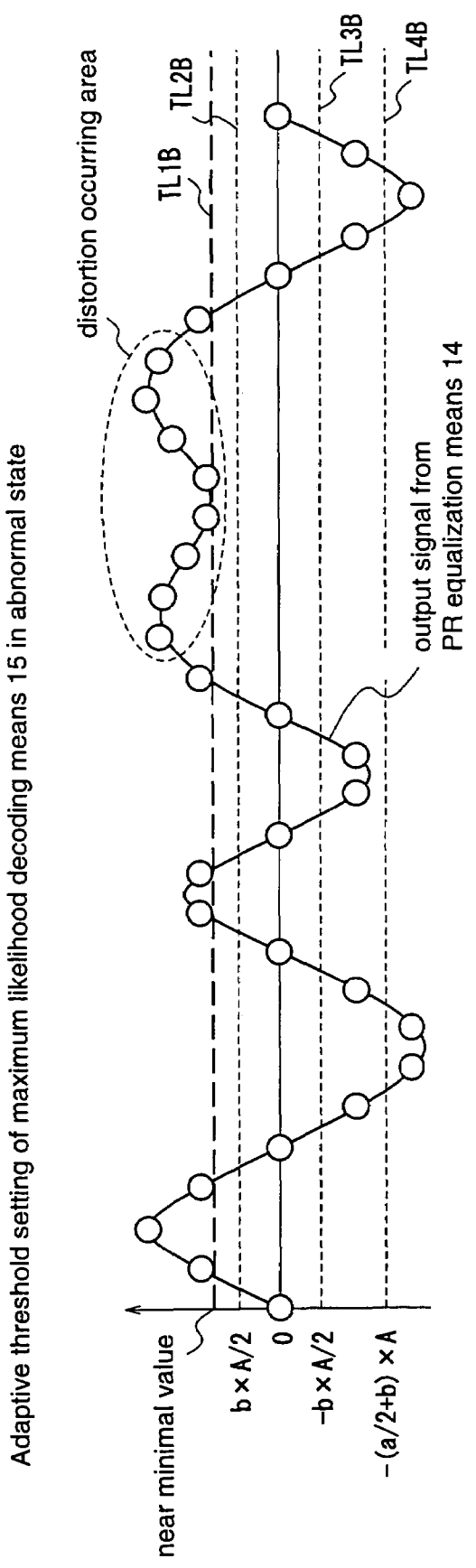

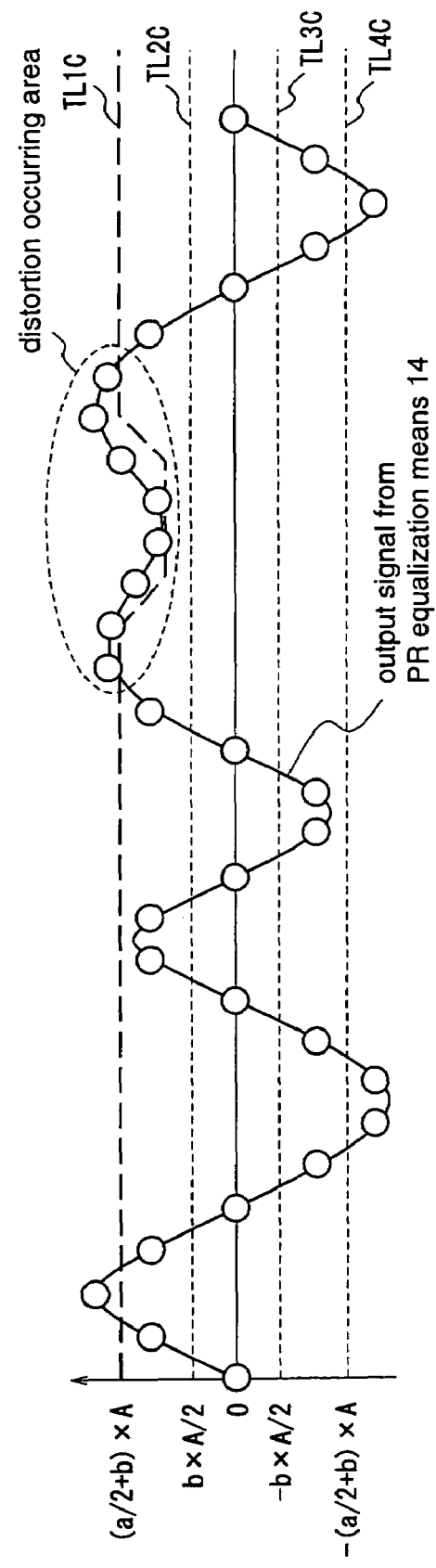

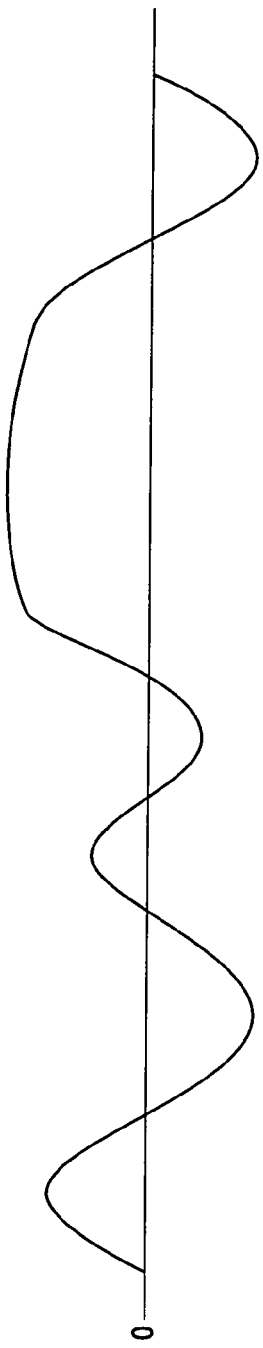
Fig.17 (a) Prior Art

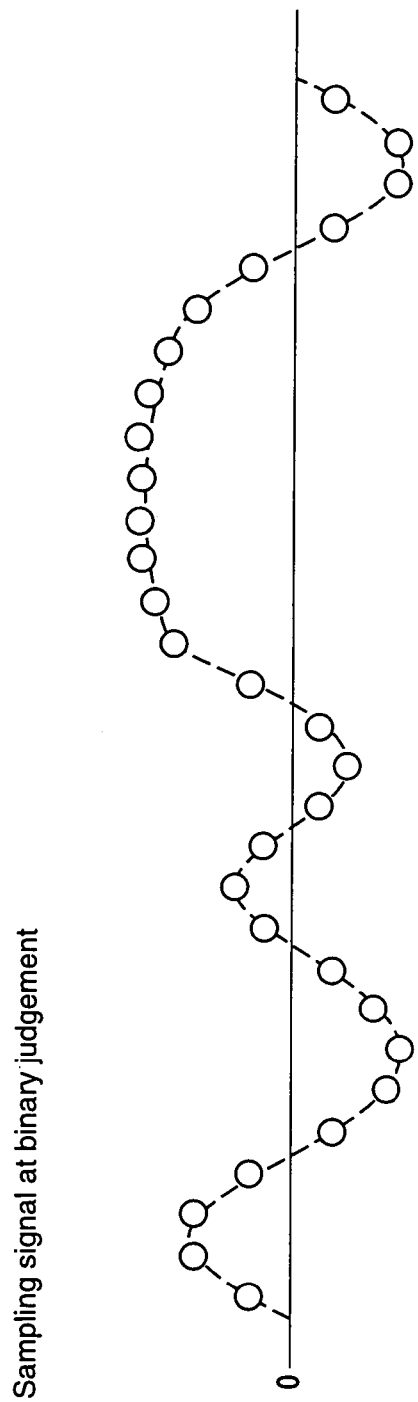
Fig.17 (b) Prior Art

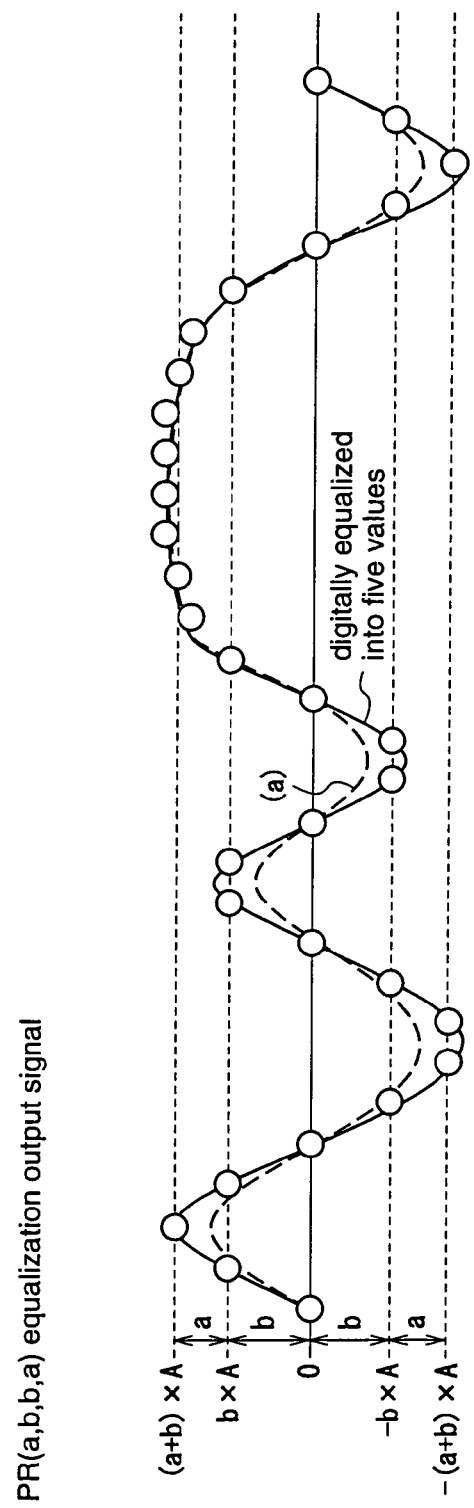
Fig.17 (c) Prior Art

US 7,339,872 B2

OPTICAL DISC DEVICE

FIELD OF THE INVENTION

The present invention relates to optical disc devices for reproducing data which are digitally recorded on an optical disc medium and, more particularly, to optical disc devices which can be suitably utilized in cases of reproducing data on a recording-type medium containing an imperfect recording mark or a large asymmetry, or a medium containing a birefringence.

More specifically, this invention relates to a read channel technology of performing signal processing to an optical reproduction waveform of an optical disc device to read a clock that is synchronized with frequency components of the optical reproduction waveform and a recorded binary signal and, more particularly, to an improved read channel technology for improving a reproduction quality which will be deteriorated depending on recording media, recording qualities, and reproduction mechanism, using a digital data demodulation means such as a PRML (partial response maximum likelihood) signal processing method which is effective for a high-density recording/reproduction in a linear direction or a level judging method of performing a binary judgement using a slice level by which recording codes are balanced.

BACKGROUND OF THE INVENTION

As methods for recording digital data on an optical disc media (information recording medium), frequently employed are methods by which a linear velocity is kept constant to uniformalize a recording density on a recording medium as in the case of compact disc (registered trademark) (hereinafter, referred to as a CD) or a DVD (digital versatile disk).

Conventionally, when reproducing digital data which have been subjected to digital modulation recording by performing mark width modulation so as to obtain a constant linear recording density, the phase of clock components corresponding to a channel bit frequency of a reproduction signal is detected, and a phase-locked loop is formed, thereby performing phase synchronization pull-in. Further, in order to improve the reproduction quality of a medium which is capable of high-density recording, such as a DVD-RAM (DVD-random access memory) or a BD (Blu-ray Disc), there has been introduced a method of performing the digital data demodulation according to a digital signal processing using the partial response maximum likelihood (hereinafter, referred to as PRML) signal processing method which is effective in linear high-density recording/reproduction.

Conventionally, a disc playback system, for example as shown in FIG. 16, which enables such phase synchronization pull-in or which realizes the digital signal processing method such as the PRML signal processing method has been employed.

In this conventional disc playback system, a digital recording code (NRZI code; NRZI is an abbreviation of Non Return to Zero Invert) as shown in FIG. 17a is recorded on an optical disc medium 1 in such a manner that the linear recording density becomes uniform. That is, it is assumed here that data are digitally recorded on the optical disc medium 1 in a pattern of the recording code such that the probabilities of occurrence of a mark (a side on which a reflected light amount is smaller) and a space (a side on which the reflected light amount is larger) are almost equal to each other, and that the recorded data are, for example, data in which the number of successive "0" or "1" is controlled to be equal to 3 or larger, and equal to 14 or smaller, as in the 8-16 modulation method. The amplitude of an optical disc reproduction waveform 3 that is obtained by playing back the optical disc medium 1 using an optical reproduction means 2 such as an optical pickup is attenuated more in higher frequency components due to interference as the recording density in the linear direction of the recorded data is made higher. Therefore, the reproduction signal is amplified by a preamplifier 4, and then correction is performed thereto for emphasizing the high frequency components by a waveform equalization means 5 as shown in FIG. 17a.

This high-frequency emphasized reproduction signal is sampled by an A/D converter 6, which is a means for converting an analog signal into a digital signal using a reproduction clock 11 which is generated by a VCO (voltage controlled oscillator) 91, thereby to obtain a multi-bit reproduction digital signal 7. At this time, when the reproduction clock 11 and clock components of the reproduction signal are in phase, sampling data as shown in FIG. 17b or 17c are obtained. FIG. 17b shows a sampling method for a case where binary judgement at an arbitrary level is performed, and FIG. 17c shows a sampling method that is especially suitable for the PRML signal processing method.

This PRML signal processing method applies a partial response system to a reproduction system in which the amplitude of high components is decreased and the signal-to-noise ratio is increased as the recording density in the linear recording direction is increased, to intentionally add waveform interference, thereby realizing a reproduction system which does not need high components, and improves the quality of reproduced data by a maximum likelihood decoding method in which the most likely sequence is estimated according to a probability calculation considering the waveform interference (for example, refer to Japanese Published Patent Application No. 2002-269925 (pp.5-6 and 12-14, FIGS. 3, 10 and 27).

The multi-bit reproduction digital signal 7 that is outputted from the aforementioned A/D converter 6 is inputted to an offset correction means 8, thereby to correct offset components in the reproduction digital signal (an offset in the amplitude direction from a center level at which a code balance is achieved). This offset-corrected reproduction digital signal 7 is demodulated into a digital binary signal by a PRML signal processing means 13 which is constituted by a transversal filter and a Viterbi decoder. At this time, since partial response equalization is applied, an equalized output signal that is outputted from the transversal filter to the Viterbi decoder in the PRML signal processing means 13 is multivalued to have five values (see FIG. 17c). This five-value equalized output signal is subjected to a probability operation by the Viterbi decoder in the PRML signal processing means 13, thereby to generate a demodulation binary signal 19 which is the most likely sequence.

The reproduction clock 11 that is used when the sampling is performed by the A/D converter 6 is controlled in a following manner.

Initially, a phase control amount for performing a phase lock control between the reproduction clock 11 and the reproduction digital signal 7 is generated using an output signal from the offset correction means 8, by a phase lock control means 9 that is constituted by a phase comparator, a loop filter, and a D/A converter. The VCO 91 is controlled in accordance with the generated phase control amount, thereby obtaining the reproduction clock 11 as an output of the VCO 91.

From the above-mentioned sequence of operations, it becomes possible to reproduce the digital data which are recorded on the optical disc medium 1 with stability and with great accuracy, by synchronizing the phases of the reproduction clock 11 and the clock components of the reproduction digital signal and utilizing the PRML signal processing method (for example, refer to Japanese Published Patent Application No. 2000-123487 (p.4, FIG. 9).

The PRML signal processing method is effective for the conventional structure in cases where the SNR (signal to noise ratio) of the reproduction signal is low, where jitter components of the reproduction signal are large, where the quality of the reproduction signal is deteriorated depending on a tilt angle which is defined by an angle between an axis perpendicular to the recording surface of the optical disc medium and an axis of an incoming laser light, or the like.

However, there are some cases where the reproduction quality is deteriorated by the PRML signal processing method with respect to an optical reproduction signal which is reproduced from a medium on which a mark of an imperfect shape is generated due to the recording performance, a medium which contains a birefringence with respect to an irradiated light from the light reproduction means, and a medium in which vertical asymmetry (hereinafter, referred to as asymmetry) of a reproduction signal is quite large, more than by the level judging method of performing the binary judgement at a slice level at which a balance of the recording code is achieved. Further, since the mark shape at the recording is remarkably deteriorated more as the recording speed is increased, it is impossible to maintain the recording quality at the high-speed recording.

SUMMARY OF THE INVENTION

The present invention provides an optical disc device which can obtain a stable reproduction quality without being affected by the recording quality, not only when the SNR (signal to noise ratio) of the reproduction signal is low, and when the jitter components of the reproduction signal are large, and when the quality of the reproduction signal is deteriorated depending on the tilt angle which is defined by the angle between the axis perpendicular to the recording surface of the optical disc medium and the axis of the incoming laser light, but also for optical reproduction signals which are reproduced from a medium on which a mark of an imperfect shape is generated, a medium including a birefringence for the light irradiated from the optical reproduction means, or a medium in which the asymmetry of the reproduction signal is extremely large.

Another object of the present invention is to provide an optical disc device which detects a distortion factor of a mark portion in a reproduction signal or an asymmetry factor of the reproduction signal, adaptively optimizes the reproduction function according to these factors, and realizes a digital data demodulation means that is suitable for demodulating optical recording data.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided an optical disc device comprising: a mark width identifying flag generation unit for generating a detection flag at a time when a predetermined mark width is detected in an optical reproduction signal that is reproduced from an optical recording medium on which data are digitally recorded according to a pattern of recording code in which probabilities of occurrence of marks and spaces are almost the same; a distortion factor measuring unit for measuring a factor of a mark distortion in a waveform occurring due to an imperfect mark shape, at a position identified by the detection flag that is outputted from the mark width identifying flag generation unit; and a partial response maximum likelihood (hereinafter, referred to as PRML) signal processing unit that is realized by a combination of a partial response equalization unit for performing a partial response equalization to the optical reproduction signal with reference to an intentional waveform interference that can reduce high frequency components which are included in the optical reproduction signal, and a maximum likelihood decoding unit for estimating a most likely sequence, and the optical disc device sets a maximum likelihood decoding threshold level for estimating a sequence in the maximum likelihood decoding unit according to the mark distortion factor, at a level at which demodulation data are not erroneously demodulated, with respect to a sequence that is judged by the mark width identifying flag generation unit as a long mark pattern. Therefore, it is possible to reduce a demodulation error with respect a sequence that is judged as a mark pattern of a long recording width, thereby improving the demodulation performance.

According to a 2nd aspect of the present invention, in the optical disc device of the 1st aspect, the maximum likelihood decoding threshold level for estimating a sequence in the maximum likelihood decoding unit is set at a level at which the demodulation data are not erroneously demodulated, according to the mark distortion factor. Therefore, even when there exists a mark distortion, it is possible to prevent a malfunction in performing the demodulation by the PRML signal processing means.

According to a 3rd aspect of the present invention, the optical disc device of the 1st aspect including: a preamplifier for emphasizing an output amplitude of the optical reproduction signal that is reproduced from the optical recording medium; a waveform equalizer for emphasizing a predetermined frequency band of the emphasized signal; an A/D converter for sampling the waveform equalized signal using a reproduction clock that is synchronous with a channel bit frequency of the optical reproduction signal, thereby obtaining multi-bit digital data; a phase-locked loop unit for controlling an oscillation frequency of the reproduction clock to be in phase with clock components of the multi-bit digital data; and an offset correction unit for performing correction to reduce offset components in an amplitude direction of the multi-bit digital data, thereby setting a position where polarities of the recording codes are balanced at a zero level, and in this device, the distortion factor measuring unit includes: a zero-cross position detection unit for detecting a zero-cross position of the reproduction signal from an output signal of the offset correction unit; a zero-cross width detection unit for counting a time interval between the zero-cross positions on the basis of the reproduction clock; a mark width identifying flag generation unit for generating a detection flag every arbitrary mark width; a maximal value calculation unit for calculating a maximal value of absolute values in an amplitude direction, in a section that is identified by the mark width identifying flag generation unit; and a minimal value calculation unit for calculating a minimal value of the absolute values in the amplitude direction, and the distortion factor measuring unit measures the mark distortion factor on the basis of a difference or a ratio between the maximal value and the minimal value. Therefore, it is possible to realize a data demodulation means that generates few demodulation errors, on the basis of the mark distortion factor.

According to a 4th aspect of the present invention, in the optical disc device of the 3rd aspect, the minimal value calculation unit calculates the minimal value by detecting the minimum value in a predetermined section near a middle point between zero crosses, and the maximal value calculation unit calculates the maximal value by detecting the maximum value in a predetermined section that is larger than the minimal value detection section. Therefore, it is possible to perform an accurate measurement of the mark distortion factor, whereby the minimal value calculation and the maximum value calculation in performing the distortion factor measurement which is necessary for realizing a data demodulation means that generates few demodulation errors, on the basis of the mark distortion factor can be performed with accuracy.

According to a 5th aspect of the present invention, in the optical disc device of the 3rd aspect, the distortion factor measuring unit further includes: a maximal value accumulation unit for accumulating outputs from the maximal value calculation unit in a predetermined measurement section; a minimal value accumulation unit for accumulating outputs from the minimal value calculation unit in a predetermined measurement section; an extreme-value averaging number—calculation unit for counting a number N (N is a positive integer) of predetermined zero-cross widths which are detected on a mark side; a maximal value averaging unit for averaging an output from the maximal value accumulation unit by using the detection number N; and a minimal value averaging unit for averaging an output from the minimal value accumulation unit by using the detection number N. Therefore, it is possible to perform an accurate measurement of the mark distortion factor, thereby realizing a distortion factor measuring means that is required for realizing a data demodulation means that generates few demodulation errors, on the basis of the mark distortion factor.

According to a 6th aspect of the present invention, the optical disc device of the 5th aspect includes: a detection stop flag generation unit for generating a detection stop flag at a time when the detection number N as an output signal from the extreme-value averaging number calculation unit has a value that is equal to M-th power of 2 (M is a positive integer) as a measurement target value, and in this device, the maximal value averaging unit averages the output from the maximal value accumulation unit by using the M-th power of 2, and the minimal value averaging unit averages the output from the minimal value accumulation unit by using the M-th power of 2. Therefore, it is possible to realize a distortion factor measuring means that is necessary for realizing a data demodulation means that generates few demodulation errors, according to the mark distortion factor, and realize at that time an operation for averaging the extreme values only by a shift operation, without a divider, thereby reducing the circuit scale.

According to a 7th aspect of the present invention, in the optical disc device of the 3rd aspect, the distortion factor measurement unit includes: a discrimination flag generation unit for generating a discrimination flag for each zero-cross width, on the basis of plural zero-cross widths which are detected by the zero-cross width detection unit; and a mark distortion factor measurement unit for measuring a mark distortion factor dependent on the respective zero-cross width, by averaging the respective maximal and minimal values which are selected by the discrimination flag. Therefore, it is possible to realize a distortion factor measuring means that is necessary for realizing a data demodulation means that generates few demodulation errors, on the basis of the mark distortion factor.

According to an 8th aspect of the present invention, in the optical disc device of the 5th aspect, the distortion factor measurement unit generates a detection error flag indicating a detection error when the number counted by the extreme-value averaging number calculation unit does not reach an averaging number as a target number due to that the mark distortion factor is high and the reproduction signal crosses a center level of the recording code in a central part of the mark, in a predetermined number of sequential data. Therefore, it is possible to indicate that the mark distortion factor is extraordinarily high in realizing a data demodulation means that generates few demodulation errors, on the basis of the mark distortion factor.

According to a 9th aspect of the present invention, there is provided an optical disc device comprising: a distortion factor measuring unit for measuring a factor of a mark distortion in a waveform occurring due to an imperfect mark shape, at a position identified by a mark width identifying flag generation unit which generates a detection flag every arbitrary mark width, with respect to an optical reproduction signal that is reproduced from an optical recording medium on which data are digitally recorded according to a pattern of recording code in which probabilities of occurrence of marks and spaces are almost the same; a level judge binarization means for demodulating the digitally recorded data by discriminating the data between two values of "0" and "1" at an arbitrary level; a partial response maximum likelihood (hereinafter, referred to as PRML) signal processing unit that is realized by a combination of a partial response equalization unit for performing a partial response equalization to the optical reproduction signal with reference to an intentional waveform interference that can reduce high frequency components which are included in the optical reproduction signal, and a maximum likelihood decoding unit for estimating a most likely sequence; and a digital data demodulation selection unit for selecting the PRML signal processing unit when the mark distortion factor of a long mark is lower than a predetermined value, and selecting the level judge binarization unit when the mark distortion factor is higher than the predetermined value. Therefore, it is possible to select an optimum data demodulation means with stability on the basis of the mark distortion factor of a mark having an unstable shape, thereby achieving a more stable and more satisfactory reproduction quality.

According to a 10th aspect of the present invention, the optical disc device of the 9th aspect further includes: a preamplifier for emphasizing an output amplitude of the optical reproduction signal that is reproduced from the optical recording medium; a waveform equalizer for emphasizing a predetermined frequency band of the emphasized signal; an A/D converter for sampling the waveform equalized signal using a reproduction clock that is synchronous with a channel bit frequency of the optical reproduction signal, thereby obtaining multi-bit digital data; a phase-locked loop unit for controlling an oscillation frequency of the reproduction clock to be in phase with clock components of the multi-bit digital data; and an offset correction unit for performing correction to reduce offset components in an amplitude direction of the multi-bit digital data, thereby setting a position where polarities of the recording codes are balanced at a zero level, in which the distortion factor measuring unit includes: a zero-cross position detection unit for detecting a zero-cross position of the reproduction signal from an output signal of the offset correction unit; a zero-cross width detection unit for counting a time interval between the zero-cross positions on the basis of a reproduction clock; a mark width identifying flag generation unit for generating a detection flag every arbitrary mark width; a maximal value calculation unit for calculating a maximal value of absolute values in an amplitude direction, in a section that is identified by the mark width identifying flag generation unit; and a minimal value calculation unit for calculating a minimal value of the absolute values in the amplitude direction, and the mark distortion factor is measured on the basis of a difference or a ratio between the maximal value and the minimal value. Therefore, it is possible to realize a structure that is necessary for selecting an optimum data demodulation means on the basis of the mark distortion factor.

According to an 11th aspect of the present invention, in the optical disc device of the 10th aspect, the distortion factor measuring unit further includes: a maximal value accumulation unit for accumulating outputs from the maximal value calculation unit in a predetermined measurement section; a minimal value accumulation unit for accumulating outputs from the minimal value calculation unit in a predetermined measurement section; an extreme-value averaging number calculation unit for counting a number N (N is a positive integer) of predetermined zero-cross widths which are detected on a mark side; a maximal value averaging unit for averaging an output from the maximal value accumulation unit by using the detection number N; and a minimal value averaging unit for averaging an output from the minimal value accumulation unit by using the detection number N. Therefore, it is possible to perform an accurate mark distortion factor measurement, thereby implementing a distortion factor measuring means that is required for selecting an optimum data demodulation means on the basis of the mark distortion factor.

According to a 12th aspect of the present invention, in the optical disc device of the 11th aspect, the distortion factor measuring unit generates a detection error flag indicating a detection error when a count number that is counted by a extreme-value averaging number calculation unit does not reach an averaging number due to that a mark distortion factor is high and the reproduction signal crosses a center level of the recording code in a central part of the mark, in a predetermined number of sequential data. Therefore, it is possible to indicate that the mark distortion factor is extraordinarily high in selecting an optimum data demodulation means on the basis of the mark distortion factor.

According to a 13th aspect of the present invention, in the optical disc device of the 9th aspect, the digital data demodulation unit has a predetermined distortion factor A (A is a positive integer), and a predetermined distortion factor B (B is a positive integer) which is higher than the distortion factor A, as judgement criteria, and the digital data demodulation unit selects the PRML signal processing unit and sets a maximum likelihood decoding threshold level of the PRML signal processing unit based on the partial response equalization level when the mark distortion factor is lower than the distortion factor A; selects the PRML signal processing unit and sets the maximum likelihood decoding threshold level of the PRML signal processing unit at a value that is near a center level of the recording code when the mark distortion factor is higher than the distortion factor A and lower than the distortion factor B; and selects the level judge binarization unit when the mark distortion factor is higher than the distortion factor B. Therefore, it is possible to perform branching of the selection operation according to the mark distortion factor, which is necessary for selecting an optimum data demodulation means on the basis of the mark distortion factor, thereby realizing a more stable and more satisfactory reproduction quality.

According to a 14th aspect of the present invention, the optical disc device of the 9th aspect further includes: a long-mark portion demodulation data judging unit for comparing a digital binary signal that is demodulated in accordance with the setting of a maximum likelihood decoding threshold level depending on the mark distortion factor and a digital binary signal that is demodulated by the level judge binarization unit with each other, and judging a ratio of matching between these digital binary signals in a mark having a long recording width, and in this device, an optimum value of a maximum likelihood decoding threshold level of the maximum likelihood decoding unit is decided so that the digital binary signals match the most. Therefore, it is possible to perform the demodulation by the PRML signal processing means even in a case where the mark distortion factor is higher in selecting an optimum data demodulation means on the basis of the mark distortion factor, thereby improving the demodulation performance.

According to a 15th aspect of the present invention, the optical disc device of the 9th aspect further includes: a virtual zero-cross width detection unit for adding, to a sequence for which a result of counting of a zero-cross width on a mark side is 1T (T is a temporal width of a recording channel bit), zero-cross widths which are immediately forward and backward of the zero-cross width; and a long-mark correction unit for replacing a result of the demodulation with a sequence of a long mark in a case where an output signal from the virtual zero-cross width detection unit coincides with a length of a pattern in which a mark distortion factor is high, and in this device, the digital data demodulation selection unit judges whether to select the PRML signal processing unit or the level judge binarization unit in accordance with the detection error flag as defined in claim 11, in a case of reproducing the digitally recorded data which are recorded using a recording code that has a run length of 2 or longer, and selects an output signal that is obtained by applying the virtual zero-cross width detection unit and the long-mark correction unit to the output from the level judge binarization unit when the mark distortion factor is too high. Therefore, it is possible to detect accurate demodulation data in selecting an optimum data demodulation means on the basis of the mark distortion factor even in a case where a data error occurs either in the PRML signal processing means or in the level judge binarization means.

According to a 16th aspect of the present invention, the optical disc device of the 9th aspect further includes: a preamplifier for emphasizing an output amplitude of an optical reproduction signal that is reproduced from the optical recording medium; a waveform equalizer for emphasizing a predetermined frequency band of the emphasized signal; an A/D converter for sampling the waveform equalized signal using a reproduction clock that is synchronous with a channel bit frequency of the optical reproduction signal, thereby obtaining a multi-bit digital data; a phase-locked loop unit for controlling an oscillation frequency of the reproduction clock to be in phase with clock components of the multi-bit digital data; an offset correction unit for performing correction to reduce offset components in an amplitude direction of the multi-bit digital data, thereby setting a position where polarities of the recording codes are balanced at a zero level; a peak envelope detection unit for detecting a peak envelope of an output signal from the offset correction unit; and a bottom envelope detection unit for detecting a bottom envelope of the output signal from the offset correction unit, and in this device, the digital data demodulation selection unit decides whether to select the PRML signal processing unit or the level judge binarization unit for demodulation of digital data, using the mark distortion factor, and further the peak envelope value that is detected by the peak envelope detection unit and the bottom envelope value that is detected by the bottom envelope detection unit, as judgement criteria. Therefore, it is possible to realize a structure that is necessary for selecting an optimum data demodulation means on the basis of the mark distortion factor, whereby it is possible to improve a mark-distortion resistant property of the PRML signal processing method, in selecting the optimum data demodulation means on the basis of the mark distortion factor.

According to a 17th aspect of the present invention, in the optical disc device of the 16th aspect, the peak envelope detection unit includes: a local maximum value detection unit for detecting a maximum value of output signals from the offset correction unit in predetermined C pieces of sampling sections (C is a positive integer); a local maximum value accumulation unit for accumulating output signals from the local maximum value detection unit in a period during which the local maximum value detection is successively repeated by D times (D is a positive integer); and a local maximum value averaging unit for averaging an output signal from the local maximum value accumulation unit by using the D value. Therefore, even when there are noises or low-band variations, it is possible to perform the peak envelope detection, which is performed to improve the mark-distortion resistant property of the PRML signal processing method in selecting an optimum data demodulation means on the basis of the mark distortion factor.

According to an 18th aspect of the present invention, in the optical disc device of the 16th aspect, the bottom envelope detection unit includes: a local minimum value detection unit for detecting a minimum value of output signals from the offset correction unit in predetermined C pieces of sampling sections (C is a positive integer); a local minimum value accumulation unit for accumulating output signals from the local minimum value detection unit in a period during which the local minimum value detection is successively repeated by D times (D is a positive integer); and a local minimum value averaging unit for averaging an output signal from the local minimum value accumulation unit by using the D value. Therefore, even when there are noises or low-band variations, it is possible to perform the bottom envelope detection, which is performed to improve the mark-distortion resistance property of the PRML signal processing method in selecting an optimum data demodulation means on the basis of the mark distortion factor.

According to a 19th aspect of the present invention, the optical disc device of the 16th aspect further includes an asymmetry factor detection unit for detecting an asymmetry factor of an optical reproduction signal on the basis of output signals from the peak envelope detection unit and the bottom envelope detection unit, and in this device, the digital data demodulation unit selects the level judge binarization unit when the symmetry factor that is detected by the asymmetry factor detection unit is high or when the mark distortion factor that is measured by the distortion factor measuring unit as defined in claim 10 is high, while selecting the PRML signal processing unit in other cases. Therefore, it is possible to select an optimum data demodulation means on the basis of the asymmetry factor of an optical reproduction signal that is reproduced from an optical recording medium, whereby it is possible to improve the reproduction quality as compared to a case where the PRML signal processing method is always used, resulting in an optimum reproduction quality also adaptive to the asymmetry factor.

According to a 20th aspect of the present invention, in the optical disc device of the 19th aspect, the asymmetry factor detection unit includes: an amplitude value detection unit for calculating a difference between the output value from the peak envelope detection unit and the output value from the bottom envelope detection unit; and an amplitude difference detection unit for adding the output value from the peak envelope detection unit and the output value from the bottom envelope detection unit, and the asymmetry factor detection unit calculates the asymmetry factor by dividing an output value from the amplitude difference detection unit by an output value from the amplitude value detection unit. Therefore, it is possible to obtain an asymmetry factor of an optical reproduction signal that is reproduced from an optical recording medium.

According to a 21st aspect of the present invention, in the optical disc device of the 16th aspect, the maximum likelihood decoding unit sets the maximum likelihood decoding threshold level for estimating a sequence in the maximum likelihood decoding unit at a level at which the demodulation data are not erroneously demodulated, in accordance with an output value from the peak envelope detection unit, an output value from the bottom envelope detection unit, and the mark distortion factor. Therefore, because the range and purpose in which the PRML signal processing method is effective are increased by optimizing the control parameter for the PRML signal processing method according to the mark distortion factor, it is possible to implement an optimum PRML signal processing method also adaptively to the asymmetric characteristics, whereby it is possible to obtain a stable and satisfactory reproduction quality even in a case where jitters, a waveform distortion, SNR, and the like are deteriorated due to high-speed recording.

According to a 22nd aspect of the present invention, the optical disc device of the 16th aspect includes: a long-mark portion demodulation data judging unit for comparing the digital binary signal that is demodulated in accordance with the setting of the maximum likelihood decoding threshold level depending on an output value from the peak envelope detection unit, an output value from the bottom envelope detection unit, and the mark distortion factor, and the digital binary signal that is demodulated by the level judge binarization signal with each other, thereby judging a ratio of matching between the demodulation data in a long mark, in which an optimum value of the maximum likelihood decoding threshold level is decided so that the demodulation data match the most. Therefore, because the range and purpose in which the PRML signal processing method is effective are increased by optimizing the control parameter for the PRML signal processing method according to the mark distortion factor, it is possible to improve the demodulation performance of the PRML signal processing method, whereby it is possible to obtain a stable and satisfactory reproduction quality even in a case where jitters, a waveform distortion, SNR, and the like are deteriorated due to high-speed recording.

According to a 23rd aspect of the present invention, in the optical disc device of the 21st aspect, the maximum likelihood decoding unit corrects the maximum likelihood decoding threshold level for a sequence which is judged as a pattern of a long mark width by the mark width identifying flag generation unit as defined in claim 10, in accordance with the output value from the peak envelope detection unit, the output value from the bottom envelope detection unit, and the mark distortion factor. Therefore, it is possible to perform the optimum threshold control, thereby realizing the optimum PRML signal processing method also adaptively to the asymmetric characteristics.

Further, since the state of recording into the medium can be accurately grasped according to the mark distortion factor or the asymmetry factor, this invention is also effective in checking the state of storage of important data, or checking a performance of a recording-type optical disc drive or an optical disc recorder. Thus, this invention is also effective in stabilizing the performance of recording-type optical disc products or reducing the period of development of the products.

BRIEF DESCRIPTION OF THE DRAWINGS

FIG. 10a is a diagram for explaining a threshold control of the maximum likelihood decoding means 15 in accordance with threshold control information 67 according to the second embodiment, which explains threshold setting of the maximum likelihood decoding means 15 in a normal state.

FIG. 10b is a diagram for explaining a threshold control of the maximum likelihood decoding means 15 in accordance with the threshold control information 67 according to the second embodiment, which explains adaptive threshold setting of the maximum likelihood decoding means 15 in an abnormal state.

FIG. 10c is a diagram for explaining a threshold control of the maximum likelihood decoding means 15 in accordance with the threshold control information 67 according to the second embodiment, which explains local adaptive threshold setting of the maximum likelihood decoding means 15 in an abnormal state.

FIG. 17a is a diagram for explaining recorded data in the prior art optical disc reproduction system and an output signal waveform of respective function-blocks, which shows an output signal of a waveform equalization means 5.

FIG. 17b is a diagram for explaining recorded data in the prior art optical disc playback system and an output signal waveform from respective function blocks, which shows a sampling signal at binary judgement.

FIG. 17c is a diagram for explaining recorded data in the prior art optical disc playback system and an output signal waveform from the respective function blocks, which shows a PR(a, b, b, a) equalization output signal.

DETAILED DESCRIPTION OF THE PREFERRED EMBODIMENTS

Hereinafter, optical disc devices according to embodiments of the present invention will be described with reference to the drawings.

Embodiment 1

Figure 1:
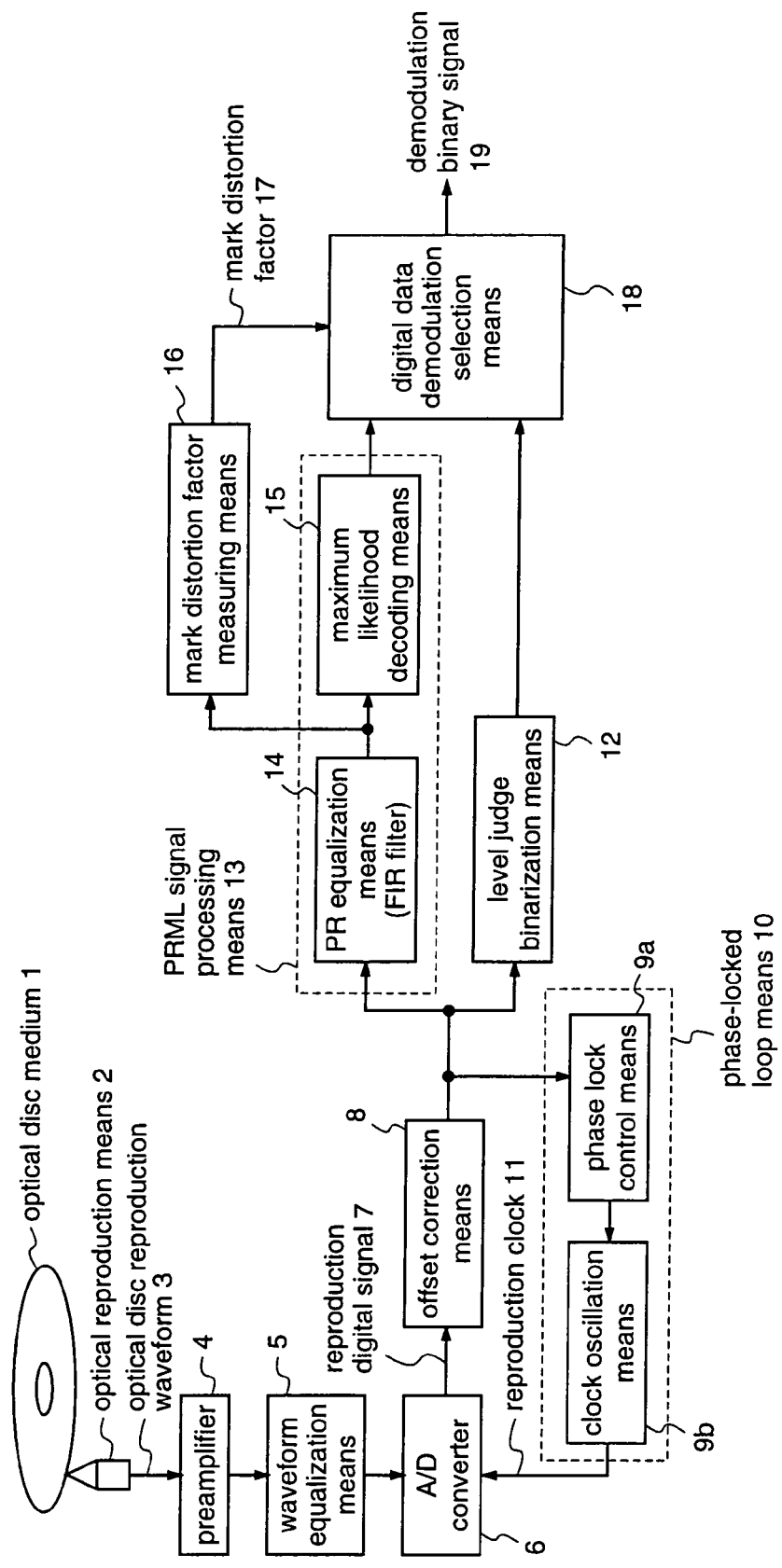
FIG. 1 is a block diagram illustrating a structure of an optical disc device according to a first embodiment of the present invention.

FIG. 1 is a block diagram illustrating a structure of an optical disc device according to a first embodiment of the present invention.

This first embodiment corresponds to claims 1, 3 to 7, 9, 10 and 13. This embodiment provides an optical disc device which, when playing back an optical disc, obtains a binary output by synchronizing a channel bit signal and a channel bit clock using a PLL, to obtain a reproduction signal from the channel, and performing the PRML signal processing to the reproduction signal or judging the signal at a slice level, in which one of the PRML signal processing method and the level judging method is selected as a means for demodulating digital data by measuring a distortion factor of a reproduction waveform which is caused by an imperfect shape of a mark recorded on an optical recording medium, thereby enabling to obtain a stable reproduction quality without being affected by the recording quality.

Figure 2:
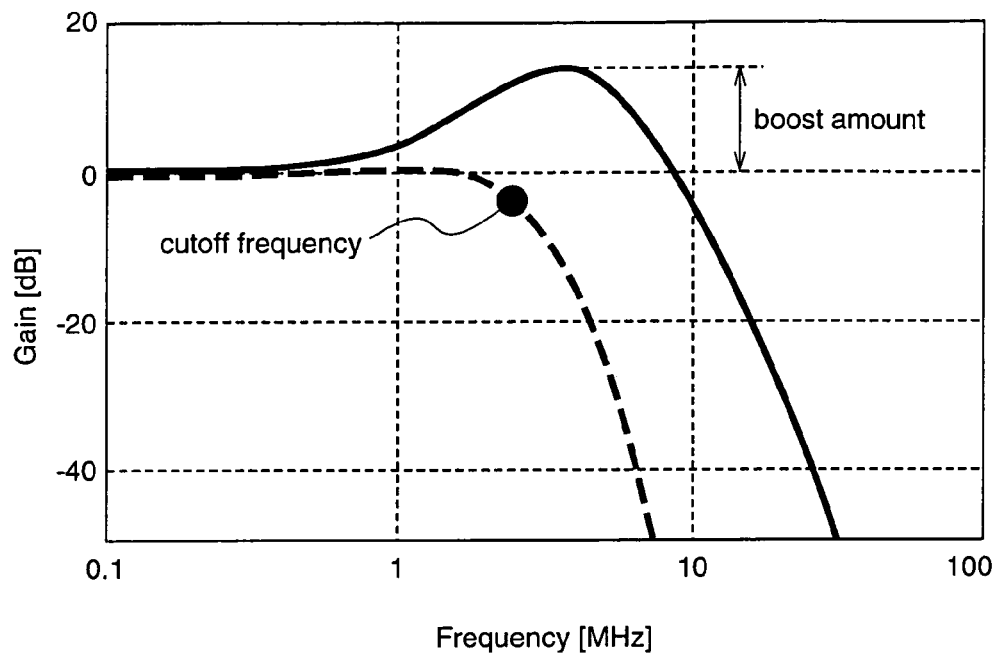
FIG. 2 is a diagram for explaining frequency characteristics of a high-order equalization ripple filter.
Figure 16:
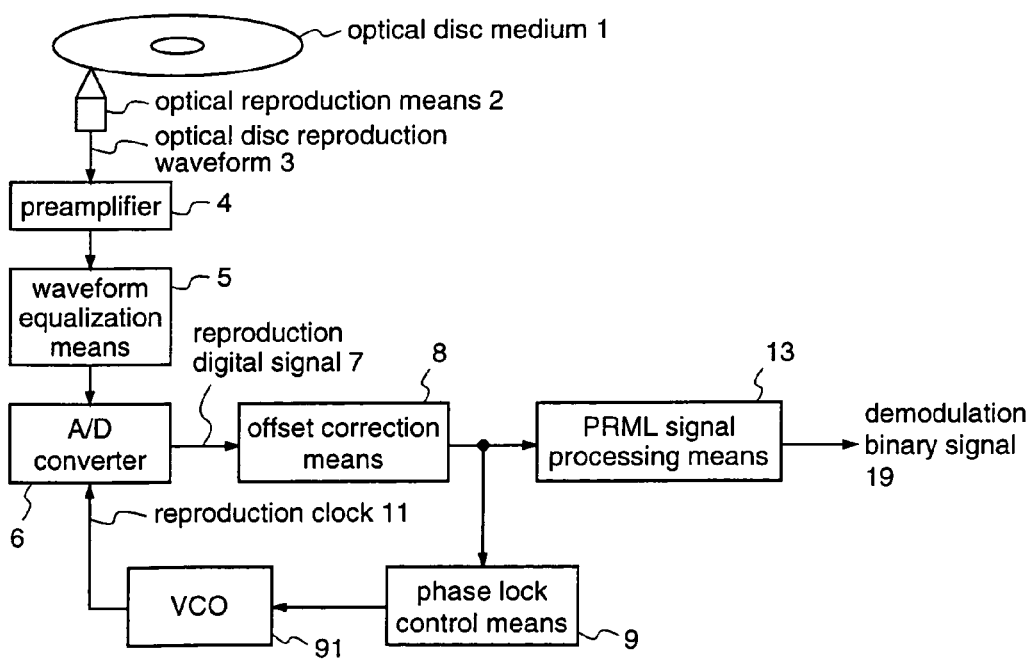
FIG. 16 is a block diagram illustrating a structure of a prior art optical disc playback system.

In FIG. 1, the same reference numerals as those in FIG. 16 denote the same or corresponding components. An optical disc reproduction waveform 3 is generated by an optical reproduction means 2 such as an optical pickup from an optical disc medium (optical recording medium) 1 as an information recording medium. In the optical disc reproduction waveform 3 that has been generated by the optical reproduction means 2, when the recording density in the linear direction is higher according to the pattern of adjacent recording codes, attenuation in the amplitude of the reproduction waveform becomes more remarkable in the high frequency components, whereby jitter components included in the optical disc reproduction waveform 3 are deteriorated. Thus, the output amplitude is emphasized by a preamplifier 4, and thereafter correction for emphasizing the high band is performed by a waveform equalization means 5, thereby amplifying the amplitude of the high frequency components in the optical disc reproduction signal to improve the jitter. Here, the waveform equalization means 5 is constituted by a filter that can arbitrarily set a boost amount and a cutoff frequency. This filter may be, for example, a high-order equalization ripple filter having frequency characteristics as shown in a solid line of FIG. 2. In this FIG. 2, characteristics shown in a dashed line are characteristics of a case where a high-band boosting is not performed.

Next, the output signal from the waveform equalization means 5 is converted into a multi-bit digital signal (hereinafter, referred to as a reproduction digital signal) 7 by an A/D converter 6 that converts an analog signal into a digital signal using a reproduction clock 11 as a timing reference. Here, the reproduction clock 11 is generated by a clock oscillation means 9b which is included in a phase locked loop means 10. That is, the reproduction clock 11 is generated on the basis of the reproduction digital signal 7, and this is generated as a clock synchronous with a channel bit frequency at a time when a signal corresponding of one channel bit of the digital data which are written in the optical disc medium is reproduced.

The clock oscillation means 9b has, for example, a structure of receiving the multi-bit digital signal as a signal for controlling the oscillation frequency, and this means may include a D/A converter that converts the control digital signal into a voltage as well as a VCO (voltage controlled oscillator) that can change the oscillation frequency in accordance with the voltage value converted by the D/A converter.

Next, by inputting the reproduction digital signal 7 which has been sampled using the reproduction clock 11 to an offset correction means 8, the center of codes in the waveform of the reproduction digital signal 7 is obtained to correct offset components in the amplitude direction, which are included in the reproduction digital signal 7.

Figure 3:
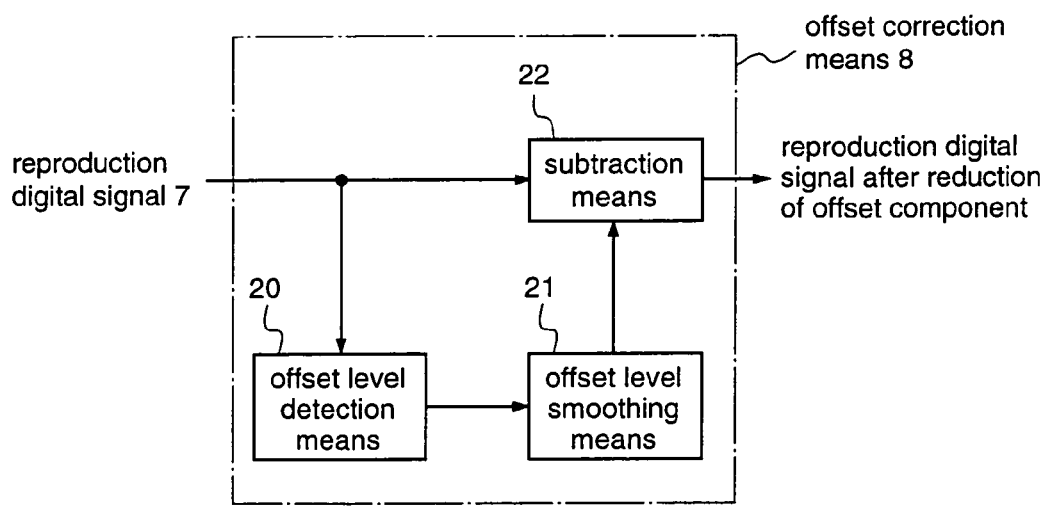
FIG. 3 is a block diagram illustrating a structure of an offset correction means 8 according to the first embodiment.

This offset correction means 8 may have, for example, a structure as shown in FIG. 3. Hereinafter, the operation of this offset correction means 8 will be described, while this circuit is exemplary only, and the present invention is not limited to this circuit. As this means 8 plays an important role to obtain an accurate mark distortion factor 17 which is obtained by a mark distortion factor measuring means 16 (which will be described later), it must a circuit having a desired performance.

In FIG. 3, offset level information in the amplitude direction is detected from the reproduction digital signal 7 by an offset level detection means 20, and the offset level information in the amplitude direction is smoothed by an offset level smoothing means 21. Next, the smoothed offset level information in the amplitude direction is subtracted from the reproduction digital signal 7 by a subtraction means 22, thereby to reduce offset components in the amplitude direction which are included in the reproduction digital signal 7. The offset level detection means 20 outputs phase information at a time when a zero-cross position is judged, from the reproduction digital signal 7, as variation information of the center level. In the meantime, when the polarity of the reproduction digital signal 7 with relative to the zero level is positive, the offset level detection means 20 adds "+A" (A is an arbitrary positive number), and when the polarity is negative, the means 20 adds "−A", thereby accumulating these information. In this case, since an accumulated signal becomes information that indicates a balance of the polarity of codes of the output signal from the offset correction means 8, it is also possible to extract offset information with respect to the center level of the codes, on the basis of the accumulation information. Next, the center level variation information and the information that indicates the balance of the code polarities are added at an arbitrary ratio, thereby to generate offset level information. Accordingly, it becomes possible to reduce the offset components in the amplitude direction included in the reproduction digital signal 7, when detecting a factor of a mark distortion included in the reproduction waveform which is generated because of an unstable shape of a mark that is recorded on the recording medium, whereby it becomes also possible to not only improve performances of a phase locked loop (PLL) control, a PRML signal processing and a level judgement, but also accurately detect nonlinear distortion component.

As described above, the reproduction digital signal 7 is obtained by performing the sampling with reference to the reproduction clock 11 that is in phase with the clock components of the channel bit frequency included in the optical disc reproduction waveform 3, using the A/D converter 6. At that time, control of the clock oscillation means 9b as a means for generating the reproduction clock 11 is performed by the phase lock control means 9a.

Figure 4:
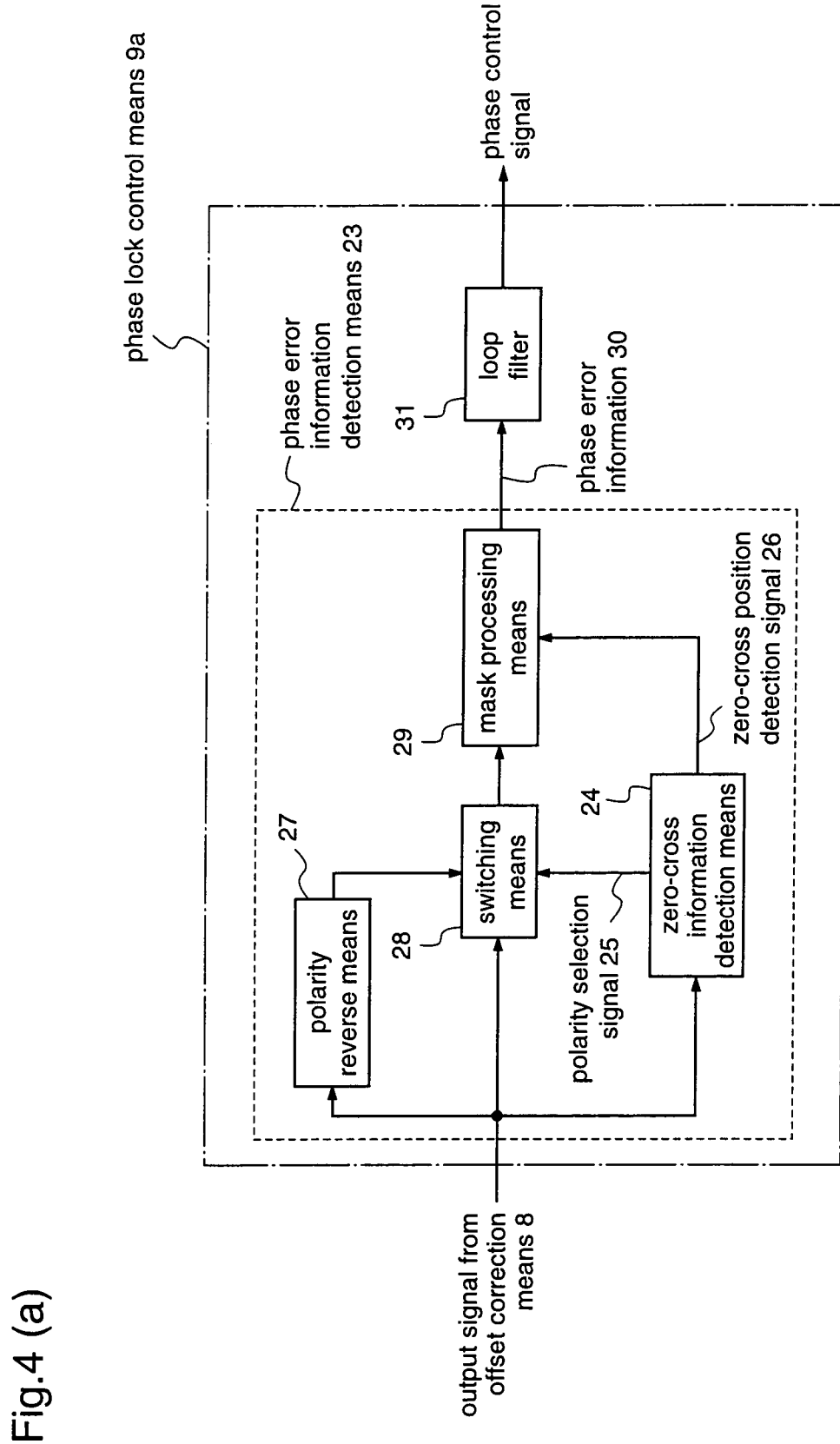
FIG. 4a is a block diagram illustrating a structure of a phase lock control means 9a according to the first embodiment.
FIG. 4b is a diagram showing the principle of detecting phase error information of the phase lock control means 9a according to the first embodiment.
Figure 4:
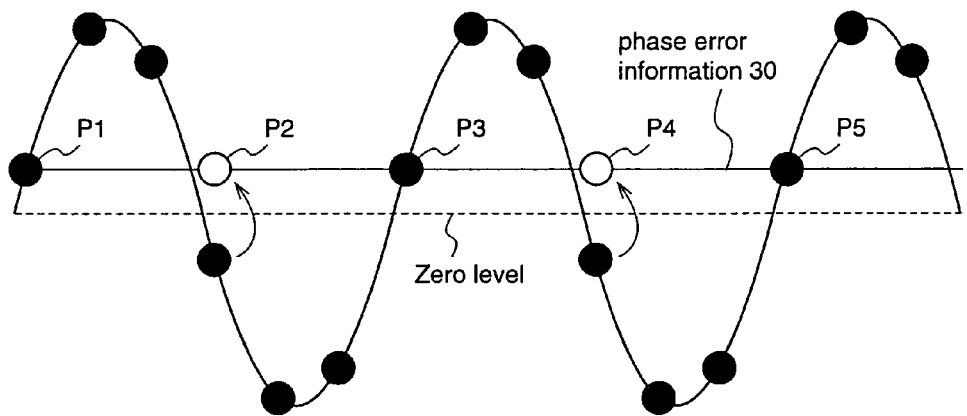

The phase lock control means 9a constitutes a phase locked loop means 10 together with the clock oscillation means 9b, and may have a structure and a principle, for example, as shown in FIG. 4a. Hereinafter, the operation of the phase lock control means 9a will be described, but this circuit is exemplary and is not limited to this example.

In a phase error information detection means 23 as shown in FIG. 4a, a zero-cross position detection signal 26 and a polarity selection signal 25 which indicates a rising edge or a falling edge are generated from an output signal from the offset correction means 8, for example, as shown by black spots ● in FIG. 4b by a zero-cross information detection means 24. When the polarity selection signal 25 indicates "positive", a switching means 28 selects a signal that is outputted from a polarity reverse means 27 as shown in FIG. 4a, while when the polarity selection signal 25 indicates "negative", the switching means 28 selects the output signal from the offset correction means 8 itself. Next, only when the zero-cross position detection signal 26 detects a zero-cross position, i.e., judges that the polarity has been reversed, a mask processing means 29 outputs the output signal from the switching means 28 as phase error information 30. At that time, it is possible to hold the phase error information 30 not only at the instance of the polarity switching but also until the next zero-cross position comes. The phase error information 30 that is obtained in this manner is indicated by "P1", "P2", "P3", "P4", and "P5" in FIG. 4b. In this case, the switching means 28 selects the output signal from the polarity reverse means 27 at "P2" and "P4" shown by white spots ○, corresponding to a falling edge.

The phase lock control means 9a performs filtering using the detected phase error information 30 by means of a loop filter 31, thereby generating a phase control signal for controlling the clock oscillation means 9b. Here, the loop filter 31 may have a structure of controlling gains of the proportional components and the integral components, and mixing the respective gains to perform the integral processing. That is, the A/D converter 6→the offset correction means 8→the phase lock control means 9a→the clock oscillation means 9b→the A/D converter 6 forms a main control loop, and then a feedback control is performed so that the phase error information 30 is made zero, thereby enabling to generate the reproduction digital signal 7 that is in phase with the clock components of the channel bit frequency of the optical disc reproduction waveform 3.

In order to demodulate the digital data that are recorded on the optical disc medium 1, it is necessary to generate a demodulation binary signal 19 by a level judge binarization means 12 that judges whether the output signal from the above-mentioned offset correction means 8 is "1" or "0" on the basis of whether this signal is higher or lower than the center level, or generate a demodulation binary signal 19 according to the PRML signal processing method that estimates an intentional inter-code interference and a most likely sequence by the probability operation. The PRML signal processing method is implemented by a PRML signal processing means 13 that generates a demodulation binary signal 19 by estimating, after a partial response equalization for suppressing high band noises and adding the intentional inter-code interference has been performed by a PR (partial response) equalization means 14 such as a FIR (finite impulse response) filter or a transversal filter, a most likely sequence by a maximum likelihood decoding means 15, such as a Viterbi decoder, on the basis of the added code rule.

Figure 5:
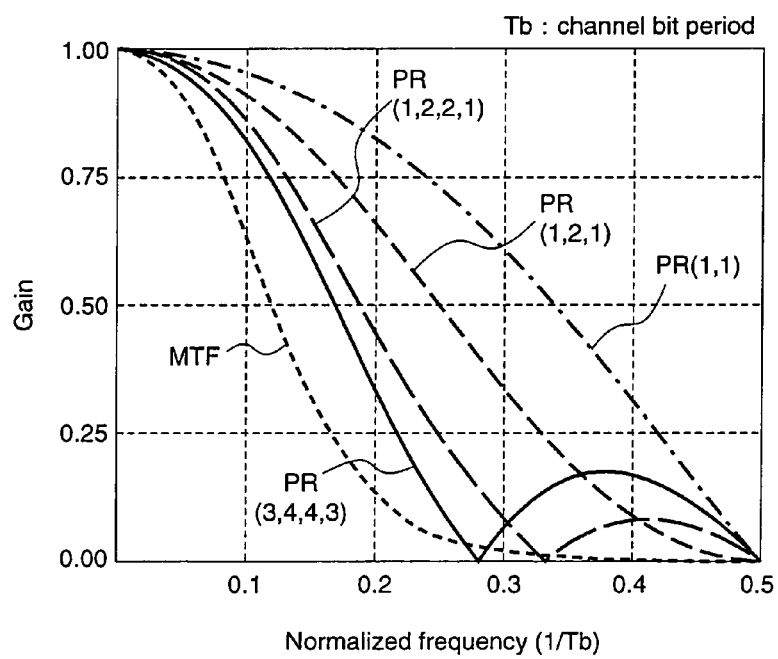
FIG. 5 is a diagram showing frequency characteristics and MTF characteristics of various types of partial response methods.

In this case, the partial response equalization may utilize PR (a, b, b, a) method by which the amplitude of the equalized waveform has five values as shown in FIG. 17c, for example for a DVD. Here, white spots ○ in FIG. 17 indicate sampling data that are obtained by the sampling using the reproduction clock 11. In a read channel that has been conventionally employed for the optical disc playback, the digital data demodulation has been performed by the level judge binarization means 12 using a slice level for a waveform equalization output signal as shown in FIG. 17a. Also when the data are sampled, the sampling is performed as shown in FIG. 17b, and the obtained multi-bit digital signal is subjected to the binary judgement using a slice level. On the other hand, in the PR(a, b, b, a) method, sampling data at four different times are added at a ratio of a:b:b:a $(a+b*D+b*D^2+a*D^3)$ (D indicates a delay of a 1-channel bit period), and characteristics of a low-pass filter as shown in FIG. 5 are added to the reproduction signal. In FIG. 5, PR(1, 2, 2, 1) method and PR (3, 4, 4, 3) method correspond to the PR(a, b, b, a) method. It is considered that a method having frequency characteristics which are closer to MTF (modulation transfer function) characteristics as shown in FIG. 5 is a more effective partial response method. There are a wide variety of partial responses other than the PR(a, b, b, a) method, in addition to the methods as shown in FIG. 5. The present invention is not limited to specific methods, and it is possible to utilize any method so long as it is adapted to the performance.

Figure 6:
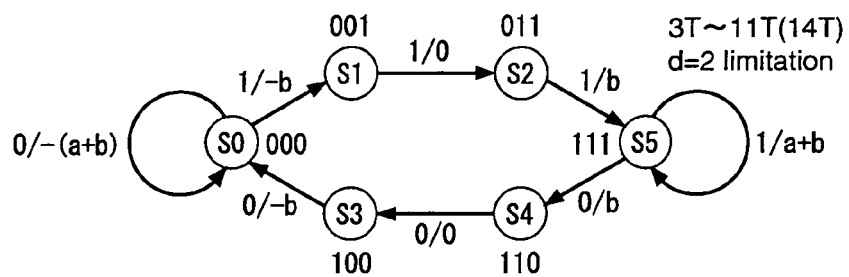
FIG. 6a is a state transition diagram for explaining an operation principle of a case where a maximum likelihood decoding means 15 according to the first embodiment is implemented by a Viterbi decoder.
FIG. 6b is a Trellis diagram for explaining the operation principle of the case where the maximum likelihood decoding means 15 according to the first embodiment is implemented by the Viterbi decoder.
Figure 6:
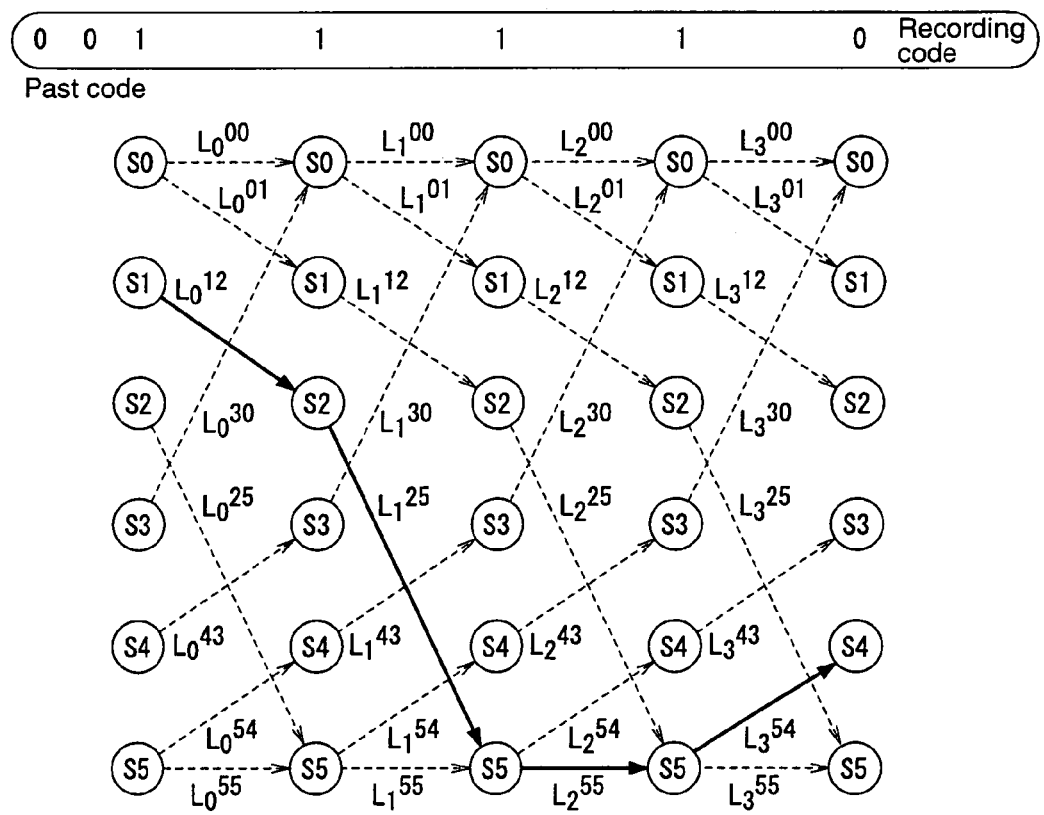

Further, the maximum likelihood decoding means 15 may be, for example, a Viterbi decoder that performs demodulation on a principle as shown in FIG. 6. The Viterbi decoder performs probability calculation in accordance with a code correlation rule which is intentionally added according to the type of the partial response, thereby to estimate the most likely sequence. For example when the applied partial response is the PR(a, b, b, a) method, the state changes as shown in a state transition diagram of FIG. 6a. This is obtained by taking into account an 8-16 demodulation code that is used especially for a DVD, and transition of six states from S0 to S5 can be expressed in association with a fact that the maximum run length is limited to "2". As for X/Y in FIG. 6a, X indicates transition of a recording code and Y indicates the signal amplitude at that time. Further, one state is expressed by codes of three adjacent times. For example, in the case of state transition from S4 "110" to S3 "100", a code "0" is added to "110", and then the code on the left end is removed by shifting these codes to left, resulting in the state S3 "100". When this is shown in a temporal continuous sequence, a Trellis diagram as shown in FIG. 6b is obtained. Then, a probability length $l_k^{ab}$ of the respective path (hereinafter, referred to as a branch metric) is calculated, and then the branch metrics are added when the state shifts to respective states. Here, "k" indicates a temporal change, and "ab" indicates a branch metric at a transition from a state Sa to a state Sb. The sum of the branch metrics at the respective state is referred to as a metric, and the signal is demodulated into binary digital data, by successively outputting a path that minimizes the metric as a survival path. That is, when the demodulation is performed in accordance with the recording code of FIG. 6b, paths as shown in solid lines are survival paths.

Figure 7:
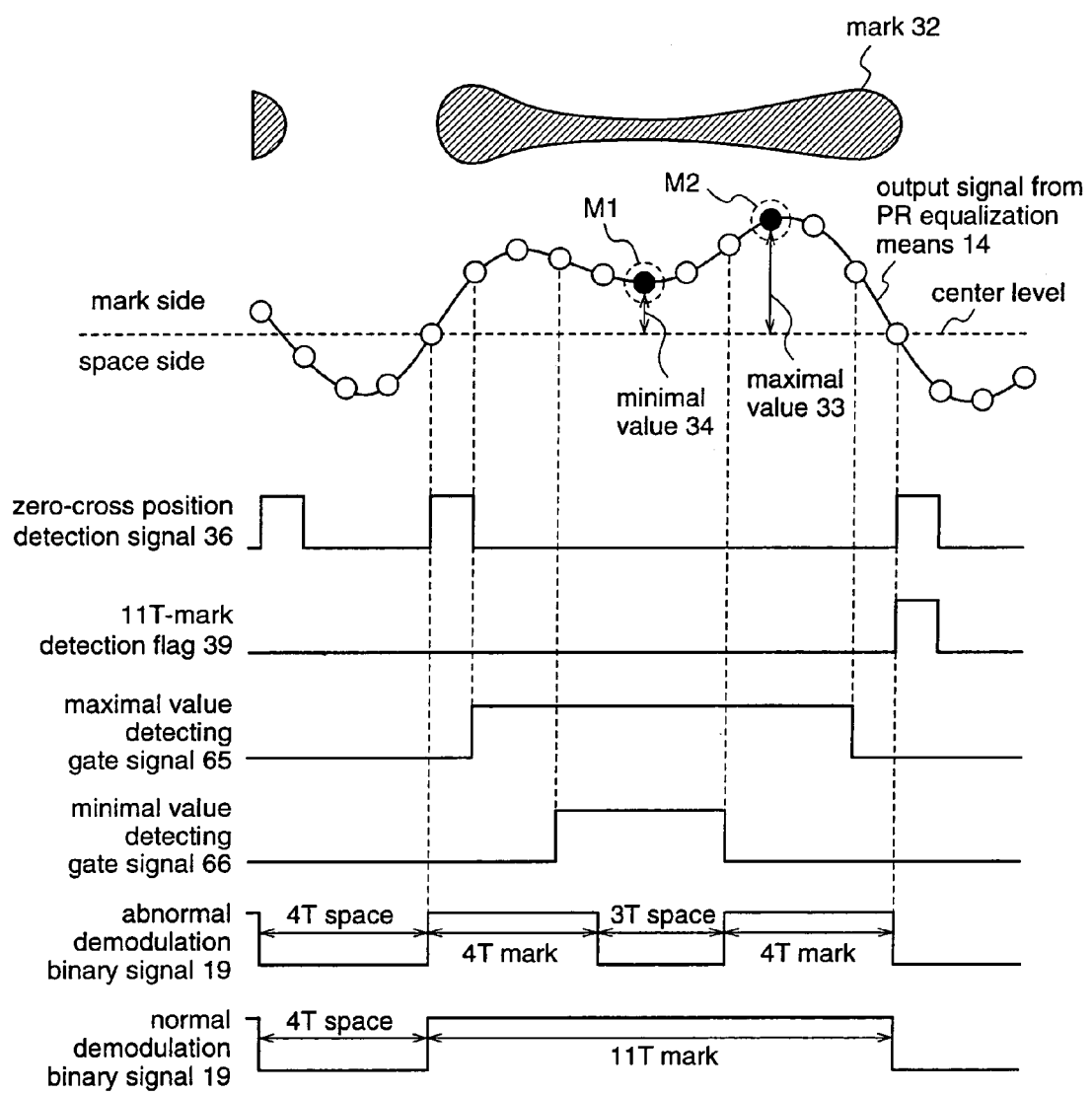
FIG. 7 is a diagram showing an illustration of the operation principle of a mark distortion factor measuring means 16 according to the first embodiment and a timing chart thereof.

Usually, the PRML signal processing method is effective for non linear distortions in the phase direction, which are generated due to noises or tilts, while the reproduction quality may be stabilized more in the level judging method such as by the level judge binarization means 12, for defects occurring due to surface flaws, fingerprints, or stains on an optical disc medium, and asymmetry (vertical asymmetry). When high-speed recording is performed in a recording-type optical disc device or an optical disc recorder, the shape of a mark that is formed on the recording surface is likely to be nonuniform or imperfect, and especially in the case of a mark having a long temporal width of 11T or 14T (T is a channel bit period), the center part area of a mark 32 becomes smaller with relative to the both ends thereof like in an 11T mark pattern as shown in FIG. 7, and thus there remains a light reflecting surface. Therefore, the light amount of the output signal from the offset correction means 8, which is detected by the light reproduction means 2 is smaller in a part that is above the center level while being larger in a part lower than the center level and, in this case, the output signal from the offset correction means 8 has a recessed part at the center portion of the 11T mark. In this case, the output signal from the PR equalization means 14 has a local minimum value (hereinafter, also referred to as a minimal value) 34 at a black spot ● M1, and a local maximum value (hereinafter, also referred to as a maximal value) 33 at a black spot ● M2. In normal cases, the signal becomes saturated near the peak, but in such cases that the shape of the mark is imperfect, the 11T mark may be erroneously demodulated as a result of the demodulation using the maximum likelihood decoding means 15 such as a Viterbi decoder, as a 4Tmark→a 3T space→a 4T mark, like an abnormal demodulation binary signal 19 of FIG. 7. On the other hand, when the level judge binarization means 12 is used, even a mark of an imperfect shape is properly demodulated as an 11T mark, like a normal demodulation binary signal 19 as shown in FIG. 7. Therefore, under such conditions, the PRML signal processing method is not always effective.

In this first embodiment, for a reproduction signal that has been subjected to partial response equalization by the PR equalization means 14, a mark distortion factor measuring means (distortion factor measuring means) 16 shown in FIG. 1 obtains the maximal value 33 and the minimal value 34 of the reproduction signal having a mark portion in which the recording width as shown in FIG. 7 is long, and detects a mark distortion factor 17 as expressed by the following equation:

(Mark distortion factor 17)=(Average value of minimal values 34)/(Average value of maximal values 33)

This mark distortion factor operation is only exemplary, and any equation can be utilized so long as it properly reflects the distortion components. Here, by calculating the mark distortion factor 17 of a specific pattern having a long recording width, such as 14T, 11T, 10T, or 9T, respectively, it becomes possible to obtain a more accurate recording state. When the mark distortion factor 17 that is detected by the mark distortion factor measuring means 16 is higher than a predetermined value (an arbitrary value that can be detected by experiment or the like), the digital data demodulation selection means 18 selects the level judge binarization means 12 as a means that demodulates the digital data in light of the above-mentioned phenomenon, while when the mark distortion factor 17 is smaller than the predetermined value, the selection means 18 selects the maximum likelihood decoding means 15. Thereby, it becomes possible to obtain a stable reproduction quality without being affected by the recording quality of the optical recording medium as a reading target.

Figure 8:
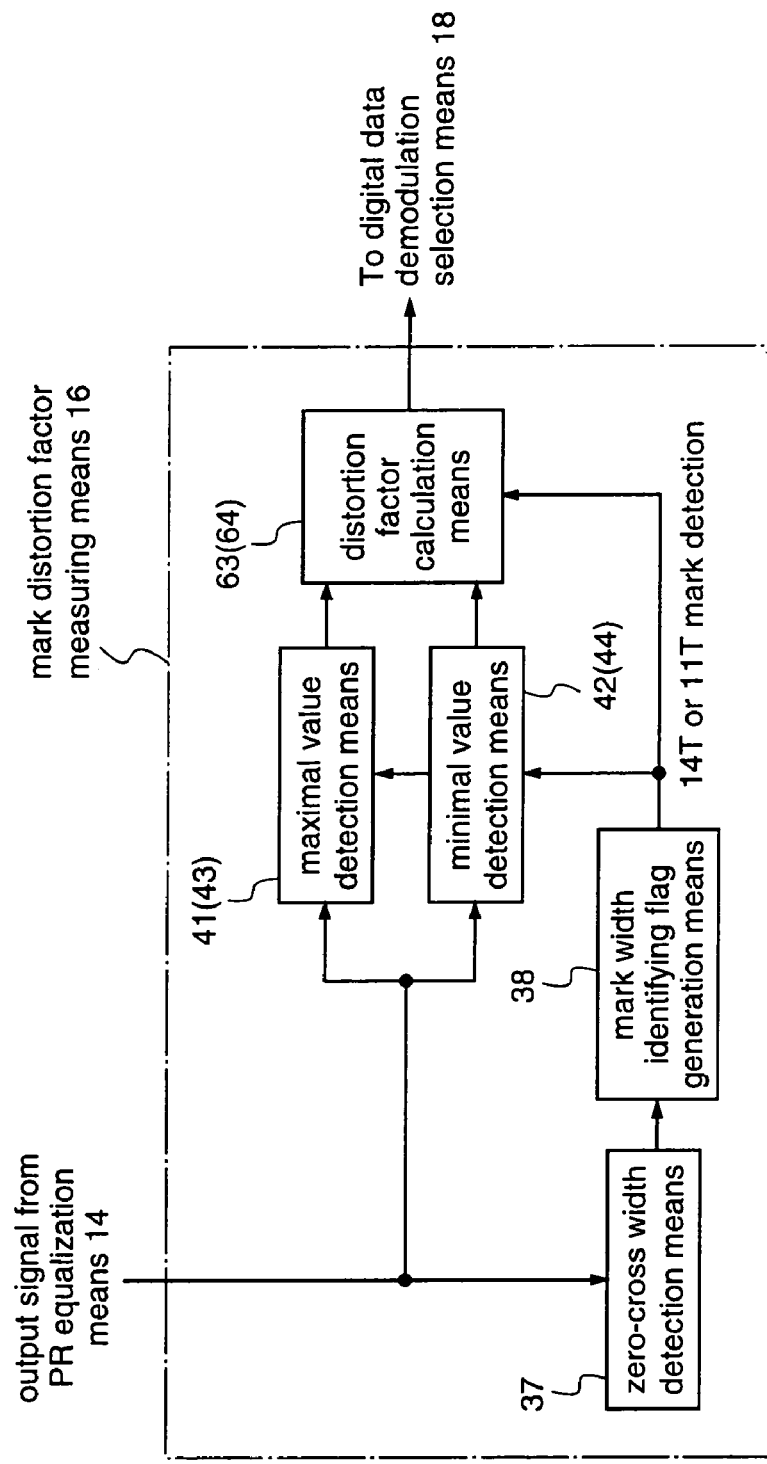
FIG. 8a is a block diagram illustrating a principle structure of the mark distortion factor measuring means 16 according to the first embodiment.
FIG. 8b is a block diagram illustrating a structure of the mark distortion factor measuring means 16 according to the first embodiment.
Figure 8:
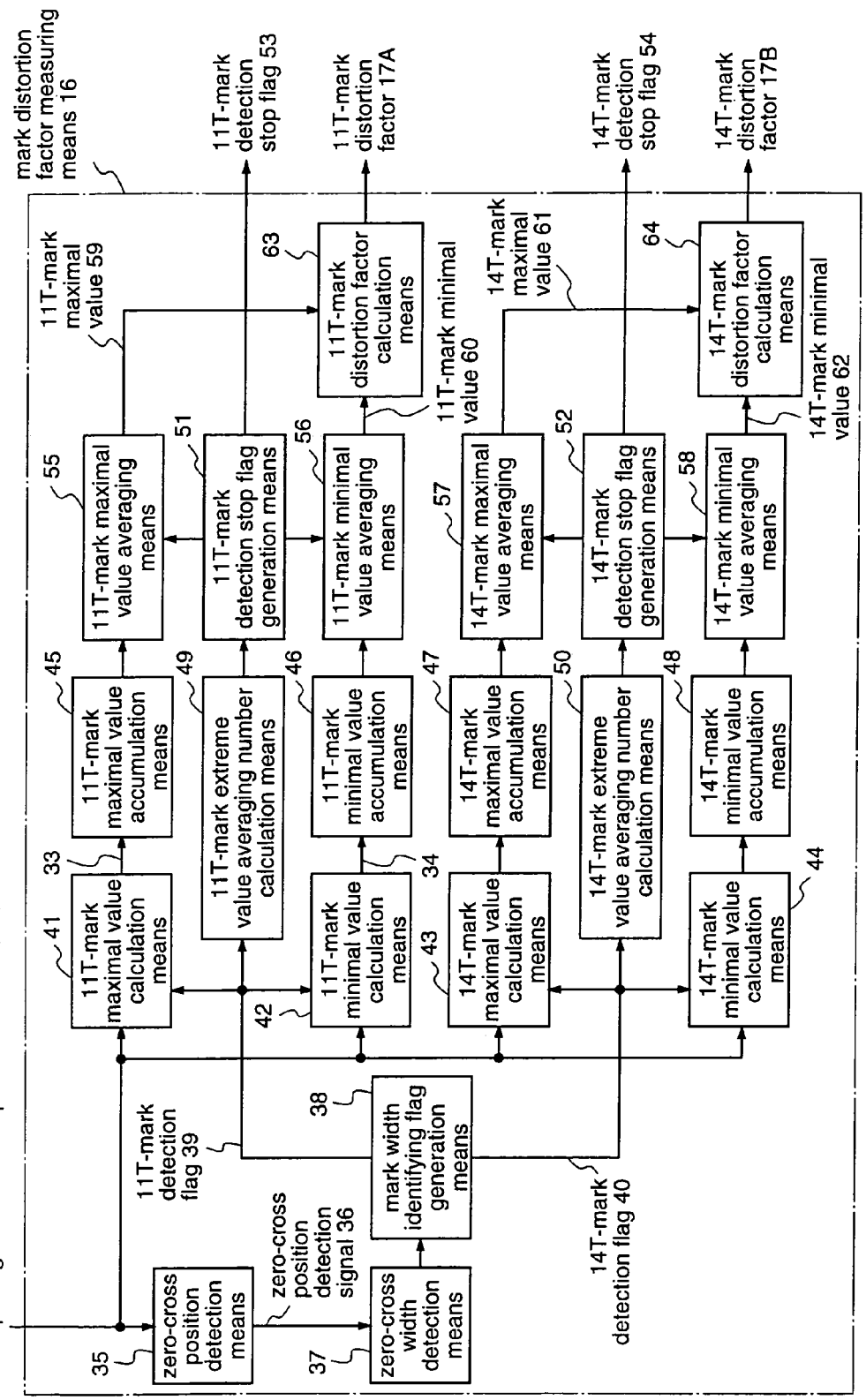

Here, the mark distortion factor measuring means 16 may have, for example, a structure and a principle as shown in FIGS. 7 and 8. Hereinafter, the operation of this measuring means will be described, but this circuit is only exemplary and the present invention is not limited to this example.

FIG. 8a schematically shows a structure of the mark distortion factor measuring means 16, in which a zero-cross width of an output signal from the PR equalization means 14 is detected by a zero-cross width detection means 37, and a 14T mark or an 11T mark (discrimination flag) is detected by a mark width identifying flag generation means 38. A maximal value detection means 41 (43) and a minimal value detection means 42 (44) detect the maximal value and the minimal value of the output signal from the PR equalization means 14 using the 14T mark or the 11T mark, and a distortion factor calculation means (mark distortion factor measuring means) 63 (64) calculates a mark distortion factor 17, using the 14T mark or the 11T mark, and the maximal value and the minimal value of the output signal from the PR equalization means 14, to be outputted to the digital data demodulation selection means 18.

In this structure, the minimal value detection means detects a minimum value in an arbitrary section that is close to the middle point between zero crosses, and the maximal value detection means detects a maximum value in a section that is wider than the minimum value detection range, whereby it is possible to obtain the maximal and minimal values with accuracy. Accordingly, the problem of a waveform including no distortion that the relationship between the maximal value and the minimal value may be reversed is overcome, whereby it becomes possible to perform a stable measurement of the mark distortion factor. It is also possible to perform the mark distortion factor detection by using a maximal value detecting gate signal and a minimal value detecting gate signal, as shown in FIG. 7.

FIG. 8b shows a detailed structure of the mark distortion factor measuring means (distortion factor measuring means) 16.

In the mark distortion factor measuring means 16 as shown in FIG. 8b, a zero-cross position is detected from the output signal of the PR equalization means 14 by a zero-cross position detection means 35, thereby generating a zero-cross position detection signal 36 as shown in FIG. 7. Then, with respect to the zero-cross position detection signal 36, an interval between zero crosses is counted by the zero-cross width detection means 37 with reference to the reproduction clock 11. On the basis of the result of the counting, a detection flag is generated by the mark width identifying flag generation means 38 at a desired mark width. For example, when an 11T mark is identified, an 11T-mark detection flag (discrimination flag) 39 as shown in FIG. 7 is generated, while when a 14T mark is identified, a 14T-mark detection flag (judgement flag) 40 is generated. As shown in FIG. 7, with reference to the 11T-mark detection flag 39, the maximal value 33 of the absolute values in the amplitude direction in the 11T-mark section is calculated by an 11T-mark maximal value calculation means (maximal value calculation means) 41, and the minimal value 34 of the absolute values in the amplitude direction is calculated by an 11T-mark minimal value calculation means (minimal value calculation means) 42. Similarly, with reference to the 14T-mark detection flag 40, the maximal value of the absolute values in the amplitude direction in the 14T-mark section is calculated by a 14T-mark maximal value calculation means (maximal value calculation means) 43, and the minimal value of the absolute values in the amplitude direction is calculated by a 14T-mark minimal value calculation means (minimal value calculation means) 44. The reason why the mark distortion factor detection is performed for a mark in which a recording width is long, such as 11T or 14T, is because it is considered that an unstable shape of the mark as indicated by the mark 32 in FIG. 7 is likely to appear more remarkably as the recording width becomes longer, while the shape of a mark that is shorter than 6T is relatively stabled. As already explained, it is also possible that, when the maximal and minimal values of the reproduction signal of a specific mark are to be detected, the maximal value detecting gate signal 65 and the minimal value detecting gate signal 66 as shown in FIG. 7 are set to accurately detect the maximal value and the minimal value, and a section that is close to the middle point between zero crosses in the specific mark is taken as the minimal value detecting gate signal 66 and a section that is wider than this section is taken as the maximal value detecting gate signal 65, whereby it is possible to avoid a detection error in a normal reproduction signal in which no mark distortion occurs, resulting in an accurate measurement of the mark distortion factor 17.

Next, in order to accurately measure the mark distortion factor 17, the maximal values and the minimal values are accumulated by an 11T-mark maximal value accumulation means (maximal value accumulation means) 45, an 11T-mark minimal value accumulation means (minimal value accumulation means) 46, a 14T-mark maximal value accumulation means (maximal value accumulation means) 47, and a 14T-mark minimal value accumulation means (minimal value accumulation means) 48, respectively, as shown in FIG. 8b. An 11T-mark extreme value averaging number calculation means (extreme value averaging number calculation means) 49 counts the number of occurrence of the 11T-mark detection flag 39, an 11T-mark detection stop flag generation means (detection stop flag generation means) 51 generates an 11T-mark detection stop flag 53 at a time when an arbitrary detection number N (N is a positive integer) has reached, and an 11T-mark maximal value averaging means (maximal value averaging means) 55 and an 11T-mark minimal value averaging means (minimal value averaging means) 56 average the respective accumulated output signals from the 11T-mark maximal value accumulation means 45 and the 11T-mark minimal value accumulation means 46 by using the detection number N, thereby outputting the 11T-mark maximal value 59 and the 11T-mark minimal value 60, respectively. Finally, an 11T-mark distortion factor 17A can be calculated by an 11T-mark distortion factor calculation means 63. Similarly, a 14T-mark extreme value averaging number calculation means 50 counts the number of occurrence of the 14T-mark detection flag 40, a 14T-mark detection stop flag generation means (detection stop flag generation means) 52 generates a 14T-mark detection stop flag 54 at a time when an arbitrary detection number N (N is a positive integer) has reached, a 14T-mark maximal value averaging means (maximal value averaging means) 57 and a 14T-mark minimal value averaging means (minimal value averaging means) 58 average the respective accumulated output signals from the 14T-mark maximal value accumulation means 47 and the 14T-mark minimal value accumulation means 48 by using the detection number N, thereby outputting a 14T-mark maximal value 61 and a 14T-mark minimal value 62. Finally, a 14T-mark distortion factor 17B can be calculated by a 14T-mark distortion factor calculation means 64.

When the above-mentioned arbitrary detection number N is set at a value that is equal to the M-th power of 2 (M is a positive integer), the operation for averaging the extreme values can be implemented only by a shift operation and accordingly it becomes unnecessary to employ a divider, whereby it is effective in reduction of the circuit scale. Further, the 11T-mark distortion factor calculation means 63 and the 14T-mark distortion factor calculation means 64 can obtain the mark distortion factor 17 by dividing the respective averaged minimal value by the corresponding averaged maximal value, while it can subtract the averaged minimal value from the averaged maximal value to take the obtained differential information as a value corresponding to the mark distortion factor 17. In the latter case (subtraction), the actual circuit structure is simpler than in the former case (division), while the measurement error becomes larger because it depends on the amplitude characteristics of the reproduction digital signal 7. Conversely, in the case of performing the subtraction, the operation becomes more complicated, while it is possible to measure a more accurate mark distortion factor 17.

It is also possible that the digital data demodulation selection means 18 switches the selection operation by using a predetermined distortion factor A (A is a positive integer) and a predetermined distortion factor B (B is a positive integer) which is larger than the distortion factor A as judgement criteria. In this case, when the mark distortion factor is smaller than the distortion factor A, the selection means 18 selects the PRML signal processing means 13 and sets the maximum likelihood decoding threshold level of the PRML signal processing means 13 based on the partial response equalization level. When the mark distortion factor is larger than the distortion factor A and smaller than the distortion factor B, the selection means 18 selects the PRML signal processing means 13 and sets the maximum likelihood threshold level of the PRML signal processing means 13 so as to be close to the center level of the recording code. When the mark distortion factor is smaller than the distortion factor B, the selection means 18 selects the level judge binarization means 12. Accordingly, it becomes possible to perform the branching at the selection operation according the value of the mark distortion factor, which is required in selecting the optimum data demodulation means according to the mark distortion factor, thereby obtaining a more stable and satisfactory reproduction quality.

As described above, according to the first embodiment, it is possible to select the PRML signal processing method or the level judging method as the means for demodulation data according to the mark distortion factor 17 which is dependent on the recording state of the optical disc medium 1, thereby-obtaining a stable reproduction quality without being affected by the recording quality of target data to be read.

Further, since the mark distortion factor 17 can be accurately measured by the mark distortion factor measuring means 16 on the basis of the width of the recording mark, it is possible not only to select the optimum demodulation method but also to correctly know the quality of the recording data which are recorded on the recording medium, whereby when long-term storage is to be performed or important data are stored, it is possible to judge whether re-recording is required or not, or whether the recording is to be performed by a low-speed recording or not.

Embodiment 2

Figure 9:
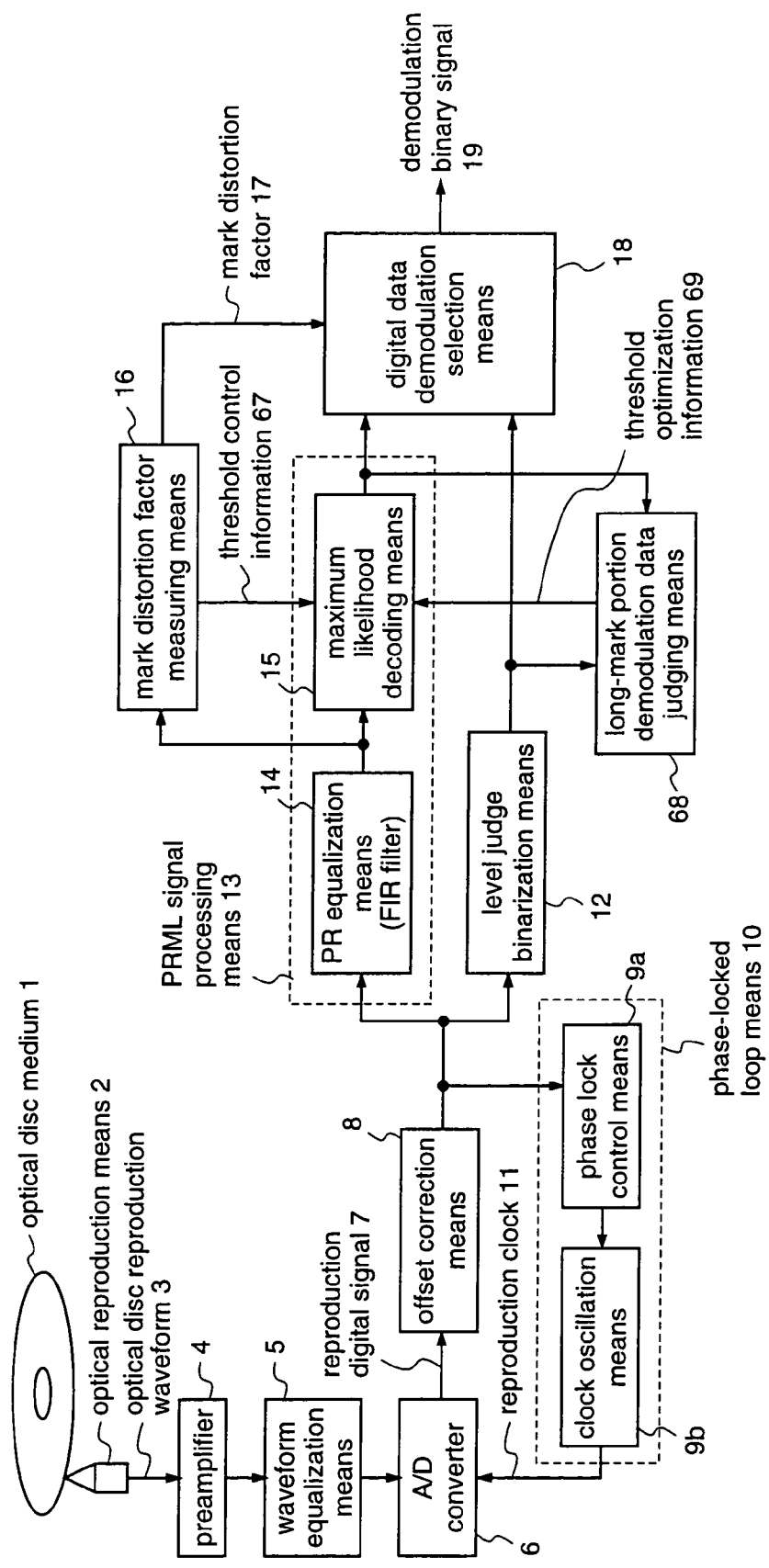
FIG. 9a is a block diagram illustrating a structure of an optical disc device according to a second embodiment of the present invention.
FIG. 9b is a block diagram illustrating a mark distortion factor measuring means 16 of the optical disc device according to the second embodiment.
FIG. 9c is a block diagram illustrating a long-mark portion demodulation data judging means 68 of the optical disc device according to the second embodiment.
Figure 9:
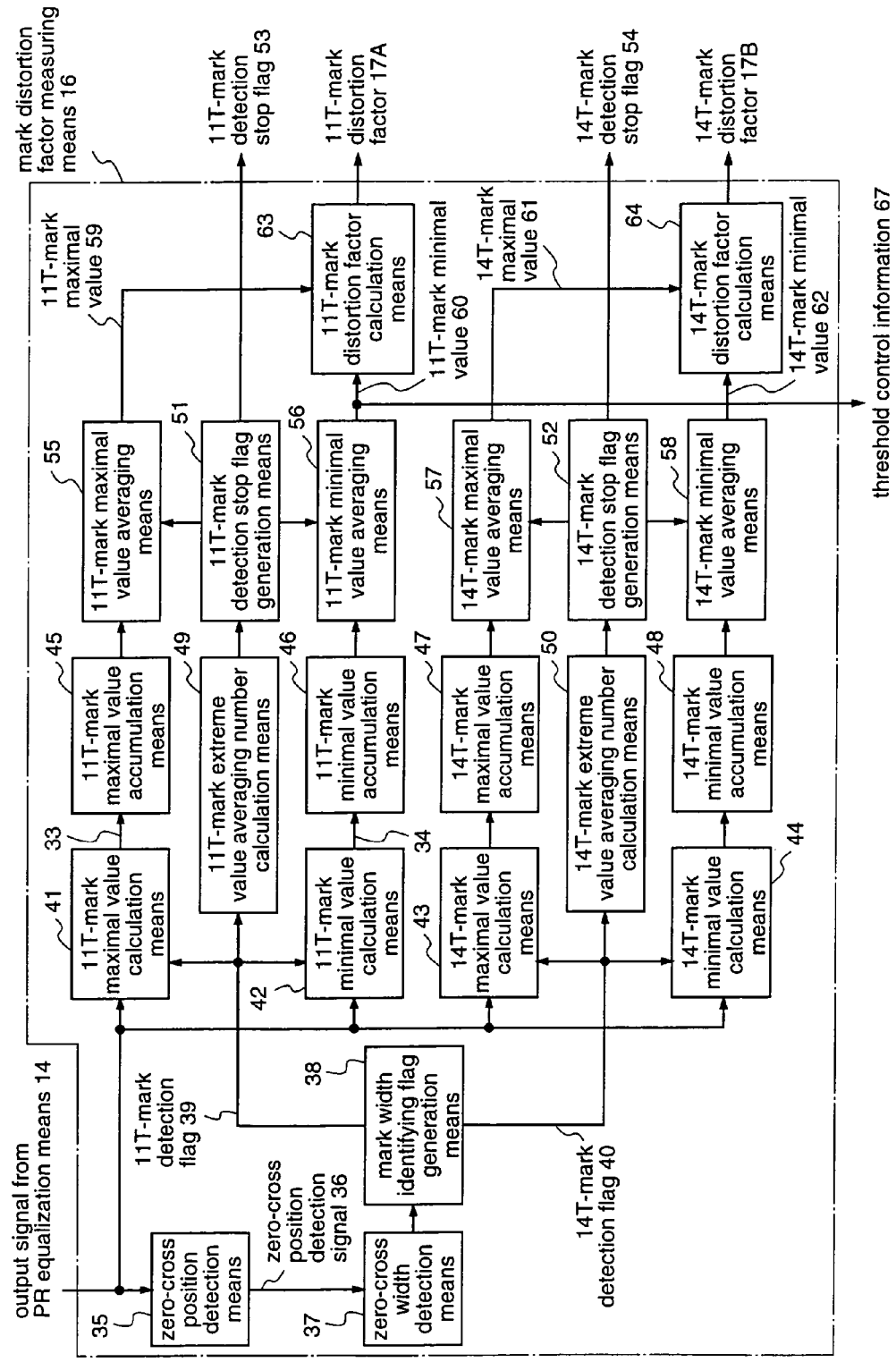
Figure 9:
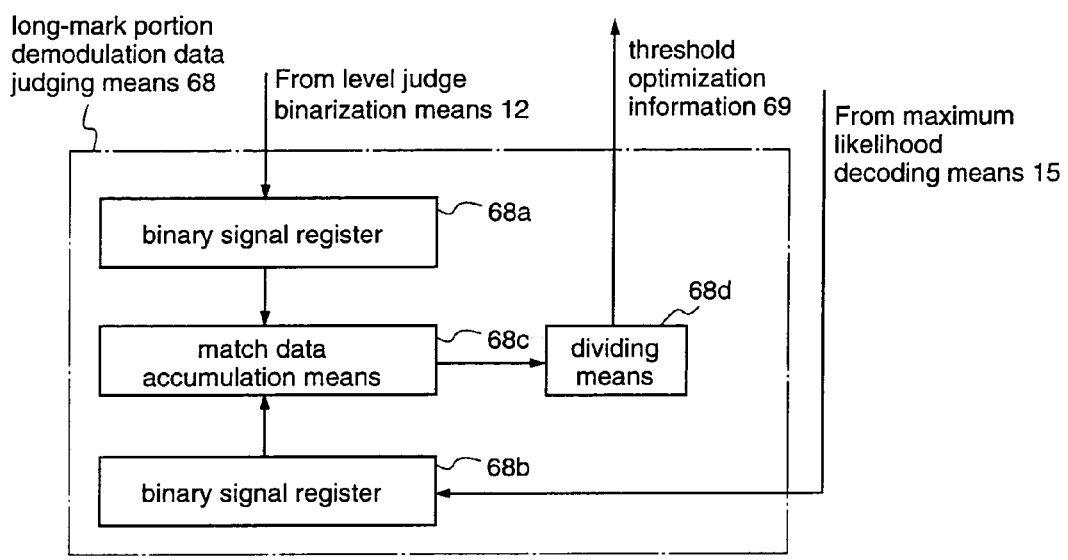

FIG. 9 are block diagrams illustrating a structure of an optical disc device according to a second embodiment of the present invention.

The second embodiment corresponds to claims 1, 2, and 14. This embodiment enables to adapt a threshold value for a metric operation in the maximum likelihood decoding means 15 of the PRML signal processing method as a means for demodulating digital data, by measuring a factor of distortion in a reproduction waveform which occurs due to an imperfect shape of the mark recorded on an optical recording medium 1, thereby to improve a mark-distortion resistant property of the PRML signal processing method. Accordingly, this embodiment provides a more stable reproduction quality without being affected by the recording quality, as compared to the first embodiment.

In FIG. 9a, the same reference numerals as those in FIG. 1 denote the same or corresponding elements. Threshold control information 67 is generated by the mark distortion factor measuring means 16, and controls a threshold value of the maximum likelihood decoding means 15 (maximum likelihood decoding threshold level). A long-mark portion demodulation data judging means 68 compares a digital binary signal that is demodulated by the maximum likelihood decoding means 15 and a digital binary signal that is demodulated by the level judge binarization means 12 with each other, to judge a ratio of matching between these demodulation data of a mark having a long recording width, and outputs threshold optimization information 69 for optimizing the threshold value of the maximum likelihood decoding means 15 on the basis of the result of the comparison.

The second embodiment is different from the first embodiment in that a function of adaptively varying the threshold value of the maximum likelihood decoding means 15 in accordance with the threshold control information 67 so as not to be affected by the mark distortion is provided. Further, a optimization loop is provided for deciding an optimum value of the threshold of the maximum likelihood decoding means 15 using the long-mark portion demodulation data judging means 68 and the threshold optimization information 69, so that the demodulation data that is outputted from the maximum likelihood decoding means 15 and the demodulation data that is outputted from the level judge binarization means 12 match the most. Accordingly, the applicable effective range of the PRML signal processing method is enlarged, and the data can be demodulated by the PRML signal processing method also in cases where the value of the mark distortion factor 17 is larger than in the first embodiment, whereby it is possible to obtain a stable and satisfactory reproduction quality when the digital data are demodulated from the optical disc medium 1 that includes a nonlinear distortion in the phase direction due to noises or tilt, and simultaneously includes a mark distortion resulting from an imperfect shape of the mark at the recording.

FIG. 10 show an example of a threshold control principle of the maximum likelihood decoding means 15. FIG. 10a shows threshold values TL1A, TL2A, TL3A, and TL4A of the maximum likelihood decoding means 15, which are applied to an output signal after PR(a, b, b, a) equalization has been performed by the PR equalization means 14 to a usual optical disc reproduction waveform 3 in which no mark distortion occurs. Here, when equalization target values of the PR equalization means 14 are five values as shown in FIG. 17c, the intermediate values of the respective equalization target values are usually applied for the threshold values. That is, when assuming that A is an arbitrary amplitude value, and a and b are arbitrary integers (for example, a=3 and b=4 when this is applied to a DVD), the respective threshold values are expressed by following formulas.

$$TL1A = (a/2+b) \times A$$

$$TL2A = (b/2) \times A$$

$$TL3A = -(b/2) \times A$$

$$TL4A = -(a/2+b) \times A$$

Here, because noises or nonlinear distortions in the optical disc reproduction waveform are not white Gauss noises (noises that do not depend on a frequency band and have a prescribed noise power spectrum), the above-mentioned value is not always optimum. When the threshold value is set as in FIG. 10a in a case where there occurs a mark distortion as shown in a distortion occurring area which is enclosed in a dashed line of FIG. 10b, a demodulation error occurs as shown by the abnormal demodulation binary signal 19 of FIG. 7 when digital data are demodulated by using the maximum likelihood decoding means 15. Then, on the basis of the 11T-mark minimal value 60 or the 14T-mark minimal value 62 which are detected in the structure as shown by the mark distortion factor measuring means 16 of FIG. 8b, the average value of the minimal values is transmitted to the maximum likelihood decoding means 15 as the threshold control information 67, for example as shown in FIG. 9b, and the threshold value (partial response equalization level) TL1B is decided on the basis of the threshold control information 67, whereby it is possible to perform proper demodulation independently of the mark distortion. The threshold values TL2B, TL3B, and TL4B may have the same value as TL2A, TL3A, and TL4A, respectively. Therefore, when the mark distortion factor 17 is small, the digital data demodulation selection means 18 selects the output signal from the maximum likelihood decoding means 15 which employs the threshold values as shown in FIG. 10a, and also when the mark distortion factor 17 is large, the selection means 18 selects the output signal from the maximum likelihood decoding means 15 which employs the threshold TL1B when the threshold value TL1B that is decided in accordance with the threshold control information 67 is not smaller than TL2A as shown in FIG. 10b, and when the mark distortion factor 17 is large and the threshold value TL1B that is decided by the threshold control information 67 is smaller than TL2A, the selection means 18 selects the output signal from the level judge binarization means 12 because the maximum likelihood decoding means 15 may cause a demodulation error. Accordingly, it is possible to obtain amore stable and more satisfactory reproduction quality than in the means of the first embodiment.

Further, the threshold value TL1B shown in FIG. 10b is effective for the mark distortion, but the reproduction quality in most areas where no mark distortion occurs has to be sacrificed to some extent. Thus, control is performed so that the threshold value of the maximum likelihood decoding means 15 for a part where the 11T-mark detection flag 39 or the 14T-mark detection flag 40 is detected, as shown in FIGS. 7 and 8, is locally adapted to a mark of a long recording width, which is considered to be greatly affected by the mark distortion, like TL1C as shown in FIG. 10c, to normally keep the value that is almost the same as TL1A, whereby it is possible to realize the maximum likelihood decoding means 15 that is effective for the mark distortion without sacrificing the entire reproduction quality. At that time, the threshold values TL2C, TL3C, and TL4C may have the same values as TL2A, TL3A, and TL4A, respectively. Here, the timing of the maximal value detecting gate signal or the minimal value detecting gate signal 66 of FIG. 7 may be employed as a point at which the threshold value is locally changed.

Further, the long-mark portion demodulation data judging means 68 compares the digital binary signal that is demodulated by the maximum likelihood decoding means 15 and the digital binary signal that is demodulated by the level judge binarization means 12 with each other, to judge a ratio of matching between these demodulation data in a mark of a long recording width, and outputs the threshold optimization information 69 for optimizing the threshold value of the maximum likelihood decoding means 15 on the basis of the result of the comparison so that these data match the most.

This long-mark portion demodulation data judging means 68 can be constituted, for example as shown in FIG. 9c, by a binary signal register 68*a* that retains a binary signal that is outputted from the level judge binarization means 12, a binary signal register 68*b* that retains a binary signal that is outputted from the maximum likelihood decoding means 15, a match data accumulation means 68*c* that counts the number of bits having the same value in bit patterns of the binary signals which are retains in the binary signal registers 68*a* and 68*b*, and a dividing means 68*d* that divides the counted number of the bits having the same value by a bit length of the binary signal (already-known value) and outputs the obtained result as the threshold optimization information 69.

Accordingly, it is possible to improve the demodulation performance of the PRML signal processing means 13 by an optimization loop, i.e., setting of the threshold values of the maximum likelihood decoding means 15→the long-mark portion demodulation data judging means 68→the threshold optimization information 69→setting of the threshold values of the maximum likelihood decoding means 15.

Here, the maximum likelihood decoding means 15 may correct the maximum likelihood decoding threshold level according to the mark distortion factor, with respect to a sequence that is judged by the mark width identifying flag generation means 38 as a mark pattern of a long recording width. Thereby, it is possible to reduce demodulation errors in the sequence that is judged as the mark pattern of a long recording width in cases of selecting the optimum data demodulation means according to the mark distortion factor, thereby improving the demodulation performance.

As described above, according to the second embodiment, similarly in the first embodiment, the PRML signal processing method or the level judging method can be selected as a means for demodulating data according to the mark distortion factor which depends on the recording state of the optical disc medium, whereby it is possible to obtain a stable reproduction quality without being affected by the recording quality of target data to be read. Further, since the threshold values of the maximum likelihood decoding means 15 can be optimized by using the threshold control information 67, the applicable effective range of the PRML signal processing method is enlarged, and accordingly it is possible to perform the demodulation by the PRML signal processing method even when the mark distortion factor 17 is larger than in the first embodiment, whereby it is possible to obtain a stable and satisfactory reproduction quality even in cases where digital data are demodulated from an optical disc reproduction waveform which simultaneously includes both a non-linear distortion in the phase direction due to noises or tile and a mark distortion that is caused by an imperfect shape of the mark at the recording.

Further, as the optimization loop is provided for locally controlling the threshold value only for the mark section having a long recording width and deciding the optimum threshold value of the maximum likelihood decoding means 15 using the threshold optimization information 69 from the long-mark portion demodulation data judging means 68 so that the demodulation data of the maximum likelihood decoding means 15 and the demodulation data of the level judge binarization means 12 match the most, it is possible to obtain a sufficiently stable and satisfactory reproduction quality by the PRML signal processing method by itself, without lowering the reproduction quality of an area in which no mark distortion occurs. Accordingly, it is possible to ensure a satisfactory reproduction quality also with respect to the recording quality of a recording-type optical disc medium for which characteristics deterioration due to the high-speed recording is feared, whereby this embodiment is the most suitable for a data reproduction apparatus at a time of reproducing important data which are stored in an information recording medium.

Embodiment 3

Figure 11:
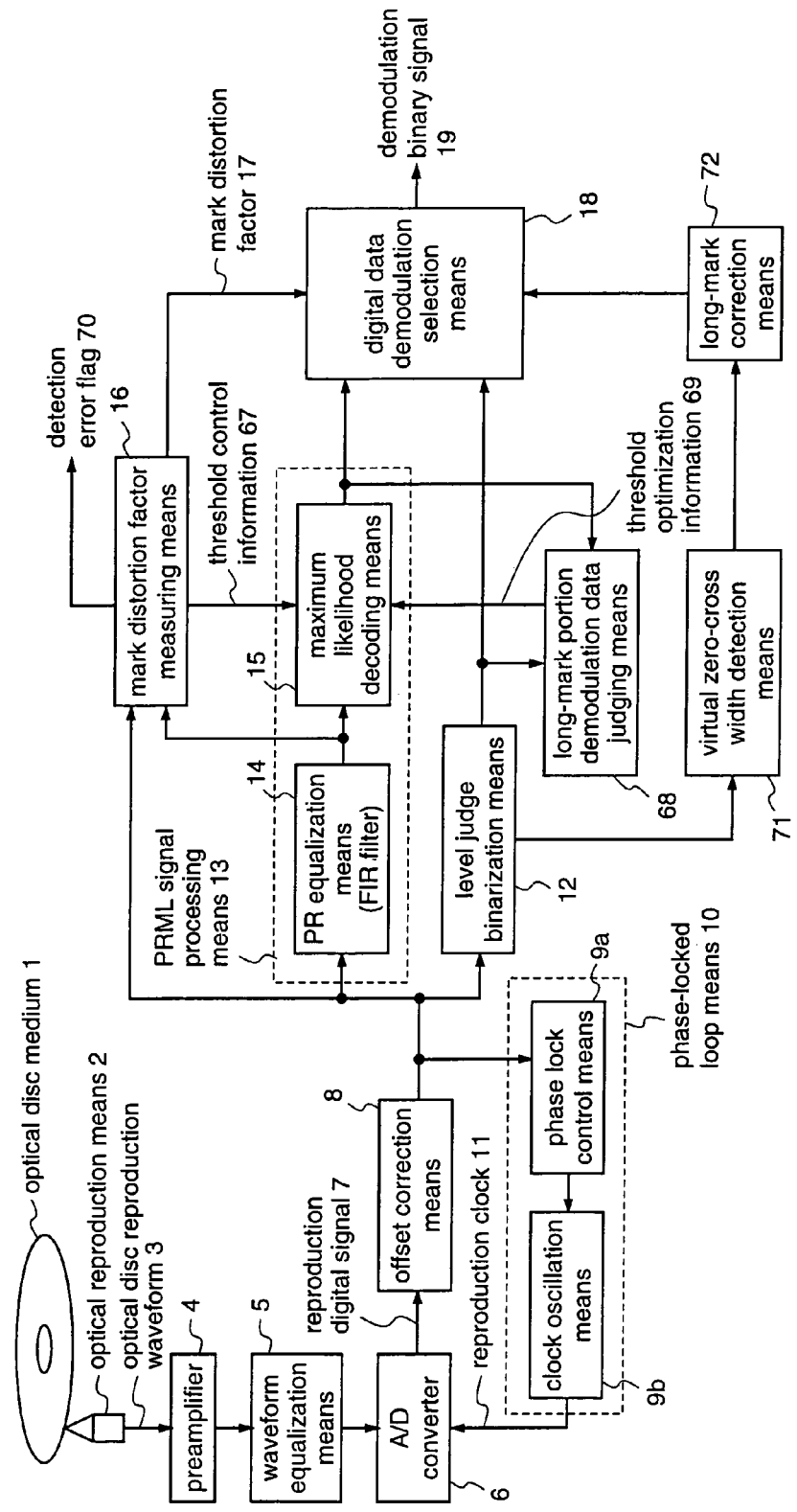
FIG. 11a is a block diagram illustrating a structure of an optical disc device according to a third embodiment of the present invention.
FIG. 11b is a block diagram illustrating a structure of a virtual zero-cross width detection means 71 of the optical disc device according to the third embodiment.
FIG. 11c is a block diagram illustrating a structure of a long-mark correction means 72 of the optical disc device according to the third embodiment.
FIG. 11d is a block diagram illustrating a structure of a mark distortion factor measuring means 16 of the optical disc device according to the third embodiment.
FIG. 11e is a block diagram illustrating a structure of a detection error flag generation means 95 of the optical disc device according to the third embodiment.
Figure 11:
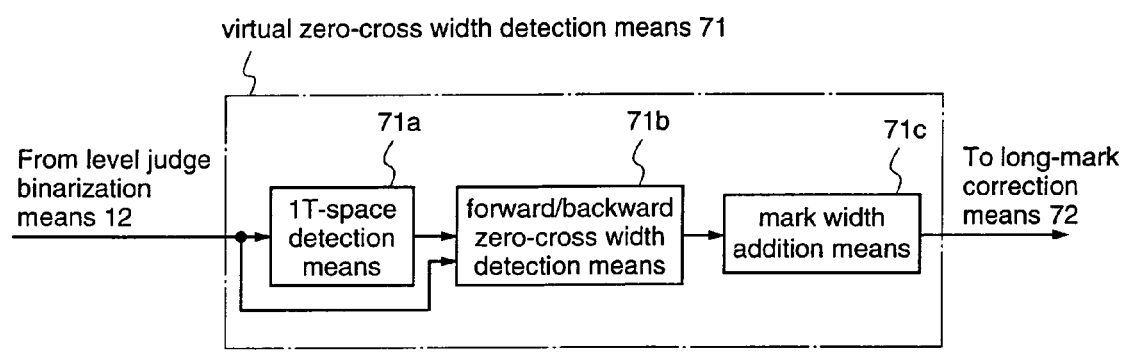
Figure 11:
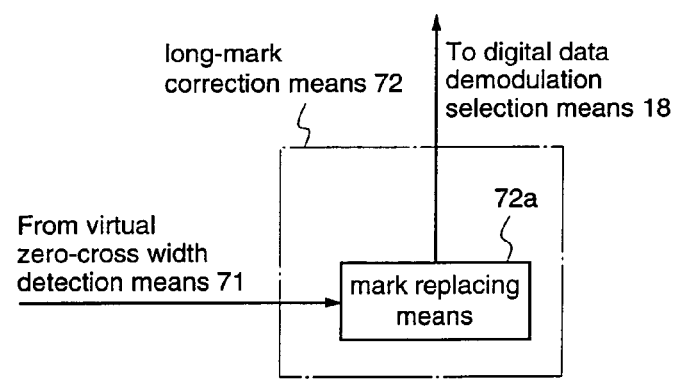
Figure 11:
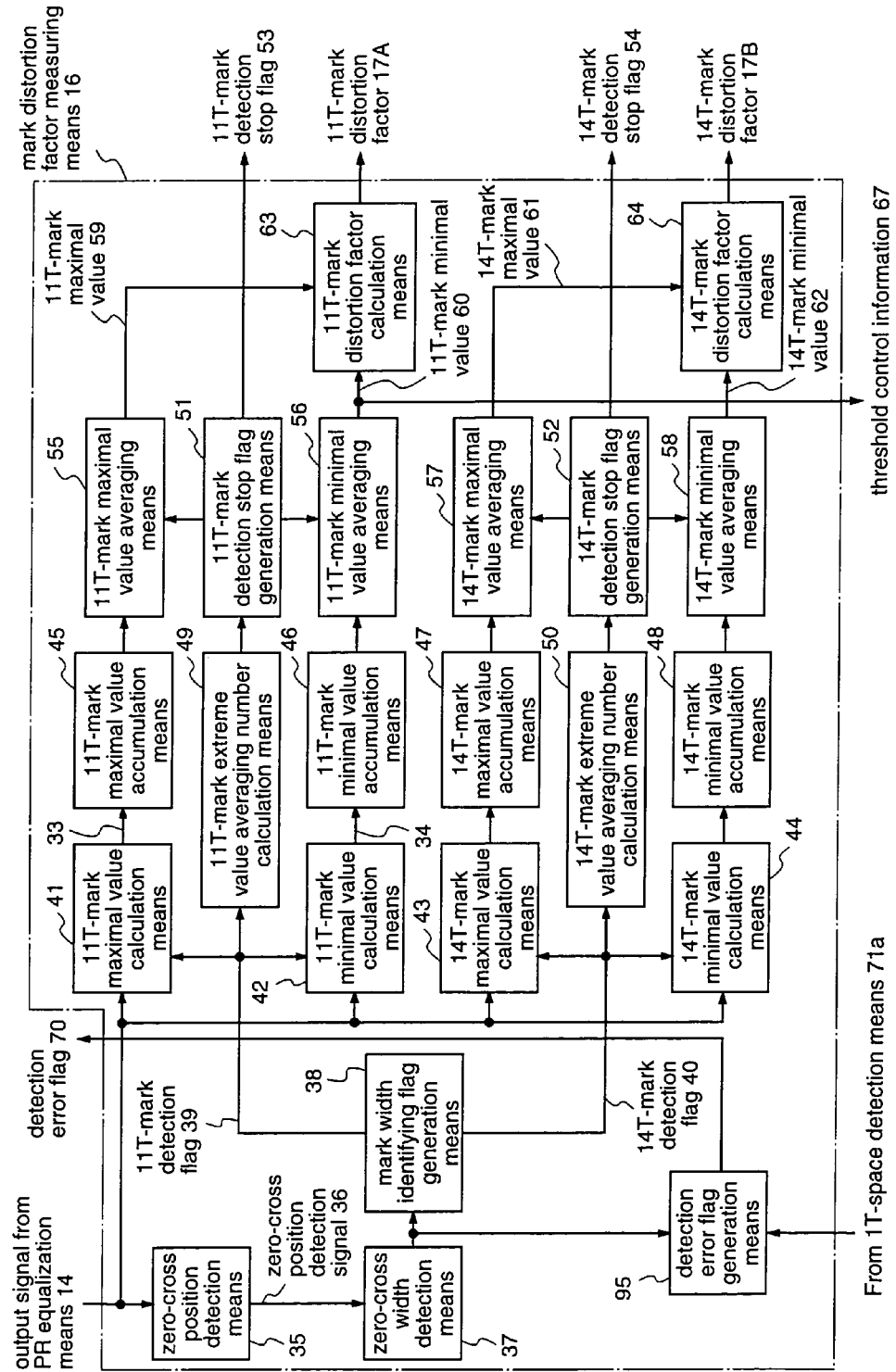
Figure 11:
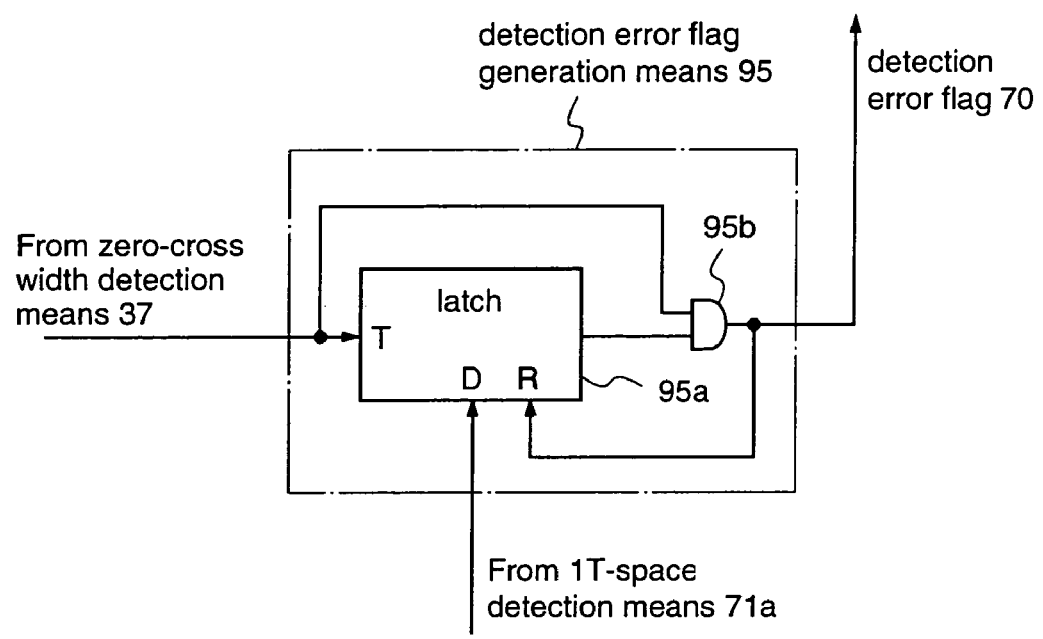

FIG. 11 are block diagrams illustrating a structure of an optical disc device according to a third embodiment of the present invention.

The third embodiment corresponds to claims 8, 12 and 15. In this third embodiment, in addition to the function as described in the second embodiment, a function of performing correction on the basis of the output signal from the level judge binarization means 12, when the mark distortion is extraordinarily large and the reproduction signal crosses the center level at the central part of the mark in the reproduction signal is added, thereby obtaining a more stable reproduction quality than in the second embodiment, without being affected by the recording quality.

In FIG. 11*a*, a detection error flag 70 is generated when the mark distortion factor measuring means 16 cannot detect a mark pattern having a long recording width as a detection object in cases where the mark distortion is extraordinarily large and the reproduction signal crosses the center level at the central part of the mark. To a sequence for which a result of counting of the zero-cross width is 1T space (T is a time interval of recording channel bit), a virtual zero-cross width detection means 71 adds zero-cross widths forward and backward the 1T zero-cross width and outputs the added result. A long-mark correction means 72 replaces a demodulation result of a mark with a sequence of a long-mark pattern when the length coincides with the length of a mark pattern in which a large mark distortion occurs, and outputs the signal to the digital data demodulation selection means 18.

The third embodiment is different from the second embodiment in that the detection error flag 70 is outputted from the mark distortion factor measuring means 16 and this signal enables to check that the mark distortion is extraordinarily large. The third embodiment is also different in that not only the output signal from the PR equalization means 14 but also the output signal from the offset correction means 8 can be inputted to the mark distortion factor measuring means 16. The third embodiment is further different in that the output from the level judge binarization means 12 is inputted to the virtual zero-cross width detection means 71 and then passed through the long-mark correction means 72, whereby it is possible to add, to a sequence in which the counted zero-cross width is 1T space, zero-cross widths which are immediately before and after the 1T zero-cross width and, when the result coincides with the length of a mark pattern in which a large mark distortion occurs, correct this to the pattern.

Further, the third embodiment is also different from the second embodiment in that the long-mark portion demodulation data judging means 68 compares the digital binary signal that is demodulated based on an output value from a peak envelope detection means 76, an output value from a bottom envelope detection means 77, and the setting of the maximum likelihood decoding threshold level depending on the mark distortion factor, and the digital binary signal that is demodulated by the level judging means 12 with each other, judges a ratio of matching between these demodulation data in a long mark, and decides the optimum values of the maximum likelihood decoding threshold level so that the demodulation data match the most. Since the range and the purposes in which the PRML signal processing method is effective are enlarged by optimizing a control parameter of the PRML signal processing method according to a mark distortion factor and an asymmetry factor, it is possible to improve the demodulation performance of the PRML signal processing method, whereby it is possible to obtain a stable and satisfactory reproduction quality even when jitter, waveform distortion, SNR, or the like is deteriorated due to high-speed recording.

Accordingly, it is possible to detect accurate demodulation data even in such cases that a data error occurs not only in the PRML signal processing means 13 but also in the level judge binarization means 12.

Therefore, it is possible to ensure a stable and satisfactory reproduction quality regardless of the recording quality of the recording-type optical disc medium, in addition to the threshold control and threshold optimization of the maximum likelihood decoding means 15 as described in the second embodiment.

In addition, there are further provided the virtual zero-cross width detection means 71 that adds, to a sequence in which the counted zero-cross width on the mark side is 1T (T is a temporal width of the recording channel bits), zero-cross widths immediately before and after the 1T zero-cross width, and the long-mark correction means 72 that replaces a demodulation result to a sequence of a long mark when the output signal from the virtual zero-cross width detection means 71 coincides with the length of a pattern in which a large mark distortion factor occurs, and then the digital data demodulation selection means 18 makes a judgement in accordance with the detection error flag when reproducing the digitally recorded data which are recorded using the recording code having a run length of 2 or longer, and selects an output signal that is obtained by applying the output from the level judge binarization means 12 to the virtual zero-cross width detection means 71 and the long-mark correction-means 72 when the mark distortion factor is extraordinarily large. Therefore, it is possible to detect accurate demodulation data even in cases where a data error occurs both in the PRML signal processing means and the level judge binarization means when the optimum data demodulation means is selected based on the mark distortion factor.

In this case, the virtual zero-cross width detection means 71 may be constituted, as shown in FIG. 11b, by a 1T-space detection means 71a for detecting a 1T space in the output from the level judge binarization means 12, a forward/backward zero-cross width detection means 71b for detecting widths from the detected 1T space to forward and backward zero crosses of the 1T space in the output from the level judge binarization means 12, respectively, from the output of the level judge binarization means 12, and a mark width addition means 71c for adding the widths from the 1T space to the forward and backward zero crosses to the 1T space.

Further, the long-mark correction means 72 may be constituted, as shown in FIG. 11c, by a mark replacing means 72a for replacing the output signal from the virtual zero-cross width detection means 71 with a replacement waveform that is generated on the basis of the sum of the 1T space and the widths from the 1T space to the forward and backward zero crosses, which are detected by the virtual zero-cross width detection means 71.

Further, the mark distortion factor measuring means 16 may include, as shown in FIG. 11d, a detection error flag generation means 95 for generating a detection error flag 70 based on the output signals from the 1T space detection means 71a and the zero-cross width detection means 37.

Further, the detection error flag generation means 95 may be constituted, as shown in FIG. 11e, by a latch 95a for latching the output signal from the 1T space detection means 71a using the output signal from the zero-cross width detection means 37 as a clock, and an AND circuit 95b for outputting an AND of the output signals from the latch 95a and the zero-cross width detection means 37 as the detection error flag 70 and resetting the latch 95a in accordance with the AND.

Figure 12:
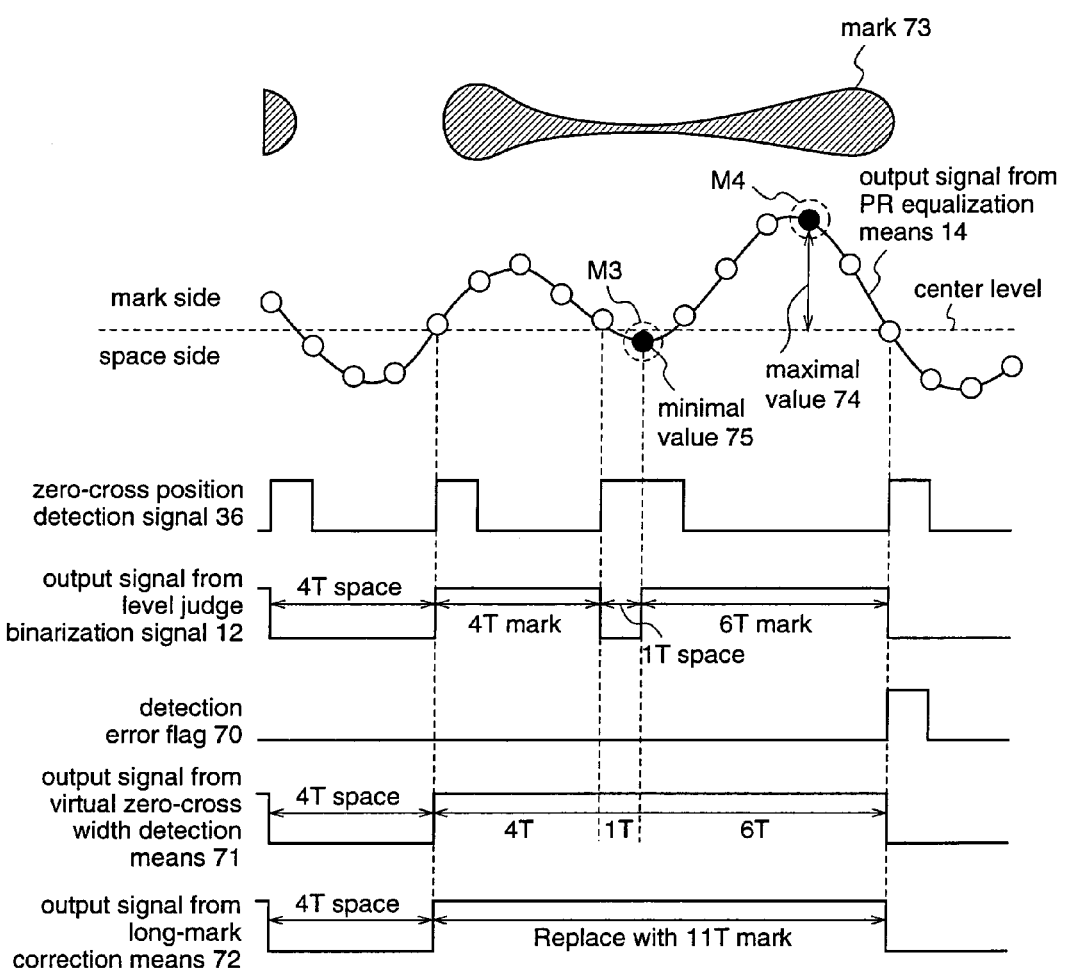
FIG. 12 is a diagram for explaining an operation principle of a virtual zero-cross width detection means 71 and a long-mark correction means 72 according to the third embodiment and a timing chart thereof.

FIG. 12 shows a flow from when the detection error flag 70 is generated from the mark distortion factor measuring means 16 until an accurate demodulation binary signal is obtained by passing through the virtual zero-cross width detection means 71, the long-mark correction means 72, and the digital data demodulation selection means 18, in a case where the mark distortion is extremely large and the reproduction signal crosses the center level at the central portion in the mark. This is exemplary only, and there is no need of implementing this embodiment in accordance with this flow. When the shape of the mark is imperfect near the center part of the mark having an extremely long recording width, like a mark 73 as shown in FIG. 12, the output signal from the offset correction means 8 has the maximal value 74 at a black spot ● M4. However, as the minimal value 75 of a black spot ● M3 comes down below the center level, the mark distortion factor measuring means 16 as described in the first embodiment cannot properly measure the mark distortion factor. The reason is because there may be a case where the zero-cross position detection signal 36 shown in FIG. 8 crosses zero at the center part of a mark that is supposed to be an 11T mark, and accordingly the zero-cross width on the mark side does not become 11T. On the other hand, a 1T-space signal is detected in the output signal from the level judge binarization means 12 as shown in FIG. 12. When the 1T space signal is detected, the mark distortion factor measuring means 16 generates the detection error flag 70 as shown in FIG. 12 at a time when the next edge on the mark side ends. When this signal is frequently generated, it can be considered that the mark distortion is extremely large. Next, the zero-cross widths forward and backward of the 1T space are added to the 1T space by the virtual zero-cross width detection means 71, thereby obtaining an output signal from the virtual zero-cross width detection means 71 of FIG. 12. In the example of FIG. 12, 4T mark+1T space+6T mark=11T mark width. Then, when the width of a pattern which has been subjected to the correction in accordance with the output signal from the virtual zero-cross width detection means 71 coincides with a mark width that has a high possibility of causing a mark distortion, the long-mark correction means 72 corrects the corresponding part in the demodulation signal of the level judge binarization means 12 using the output signal from the virtual zero-cross width detection means 71 to be replaced therewith. As a result, it is possible to obtain an output signal of the long-mark correction means 72 as shown in FIG. 12. Thereafter, the digital data demodulation selection means 18 selects the output signal of the long-mark correction means 72, to generate the demodulation binary signal 19.

The mark distortion factor measuring means 16 may generate a detection error flag indicating a detection error when the numbers that are counted by the extreme value averaging number calculation means 49 and 50 do not reach the averaging numbers because the mark distortion factor is large in an arbitrary number of pieces of sequential data and the reproduction signal crosses the center level of the recording code in the central part of the mark, whereby it is possible to indicate that the mark distortion factor is extremely large at a time of selecting the optimum data demodulation means on the basis of the mark distortion factor.

As described above, according to the third embodiment, the detection error flag 70 is generated by the mark distortion factor measuring means 16, and the reproduction signal is passed through the virtual zero-cross width detection means 71, the long-mark correction means 72, and the digital data demodulation selection means 18 to obtain an accurate demodulation binary signal, whereby it is possible to obtain accurate demodulation data even in cases where both the PRML signal processing means 13 and the level judge binarization means 12 cause a data error.

Therefore, in this third embodiment, the control of the threshold values of the maximum likelihood decoding means 15 is performed by the mark distortion factor measuring means 16 and the long-mark portion demodulation data judging means 68, whereby it is possible improve the reproduction quality and to ensure a stable and satisfactory reproduction quality regardless of the recording quality of the recording-type optical disc medium, as in the second embodiment. This is greatly effective for the case of recording media including errors that cannot be corrected by the ability of a correction parity which is attached to the recording code as the recording quality that is obtained at the high-speed recording. Further, this is also useful for purposes such that data which are stored in these recording media are read again and recorded as normal data. It may also have the possibility of improving the performance of PLL control (phase lock control) which is required for the reproduction, by increasing the reproduction probability of the 14T pattern that is a SYNC pattern (synchronous pattern) of 8-16 modulation.

Embodiment 4

Figure 13:
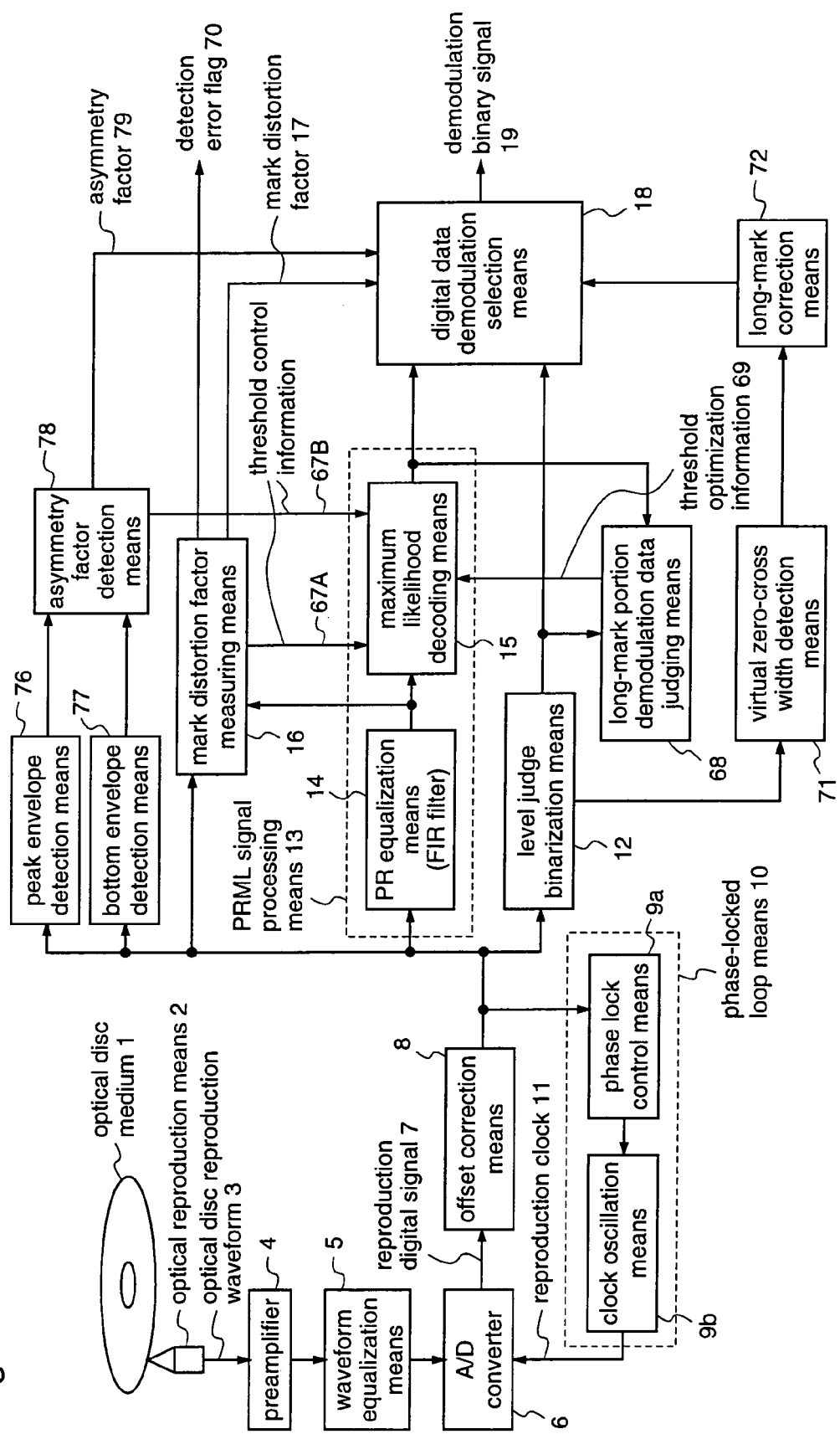
FIG. 13 is a block diagram illustrating a structure of an optical disc device according to a fourth embodiment of the present invention.

FIG. 13 is a block diagram illustrating a structure of an optical disc device according to a fourth embodiment of the present invention.

The fourth embodiment corresponds to claims 16 to 23. In addition to the function as described in the third embodiment, this embodiment enables to adapt the threshold values for the metric operation in the maximum likelihood decoding means 15 in the PRML signal processing method and to select the PRML signal processing method or the level judging method as a means for demodulation digital data, as already described in the first to third embodiments, by detecting a peak envelope 86 and a bottom envelope 87 of the reproduction signal and further detecting an asymmetry factor 79 from the detected envelope information, thereby to combine the envelope information, the asymmetry factor 79, and the mark distortion factor 17. Since the envelope information and the asymmetry information is newly added, it is possible to improve the mark-distortion resistant property and the asymmetry resistant property of the PRML signal processing method, and accordingly obtain a more stable reproduction quality independently of the recording quality, as compared to the third embodiment.

In FIG. 13, a peak envelope detection means 76 detects a peak envelope value from the output signal of the offset correction means 8. Similarly, a bottom envelope detection means 77 detects a bottom envelope value from the output signal of the offset correction means 8. An asymmetry factor detection means 78 detects an asymmetry factor 79 on the basis of the peak envelope value and the bottom envelope value.

The fourth embodiment is different from the third embodiment in that the peak envelope value and the bottom envelope value are detected from the output signal of the offset correction means 8 by the peak envelope detection means 76 and the bottom envelope detection means 77, respectively, then the asymmetry factor 79 is detected by the asymmetry factor detection means 78, threshold control information 67B of the maximum likelihood decoding means 15 is generated on the basis of these signals, and a judgement criterion is decided according to the mark distortion factor 17 and the asymmetry factor 79 by the digital data demodulation selection means 18 so as to select an optimum demodulation binary signal. The fourth embodiment is further different in that the optimization of the threshold values of the maximum likelihood decoding means 15 can be performed on the basis of threshold control information 67A that is outputted from the mark distortion factor measuring means 16 and the threshold control information 67B. Accordingly, an applicable effective range of the PRML signal processing method is enlarged, whereby it is possible to obtain a stable and satisfactory reproduction quality in cases of demodulating the digital data from an optical disc medium 1 in which a nonlinear distortion in the phase direction due to noises or tilt, and a mark distortion that is caused by an imperfect shape of a mark at the recording, and an asymmetry (vertical asymmetry) in the reproduction signal are simultaneously included.

Figure 14:
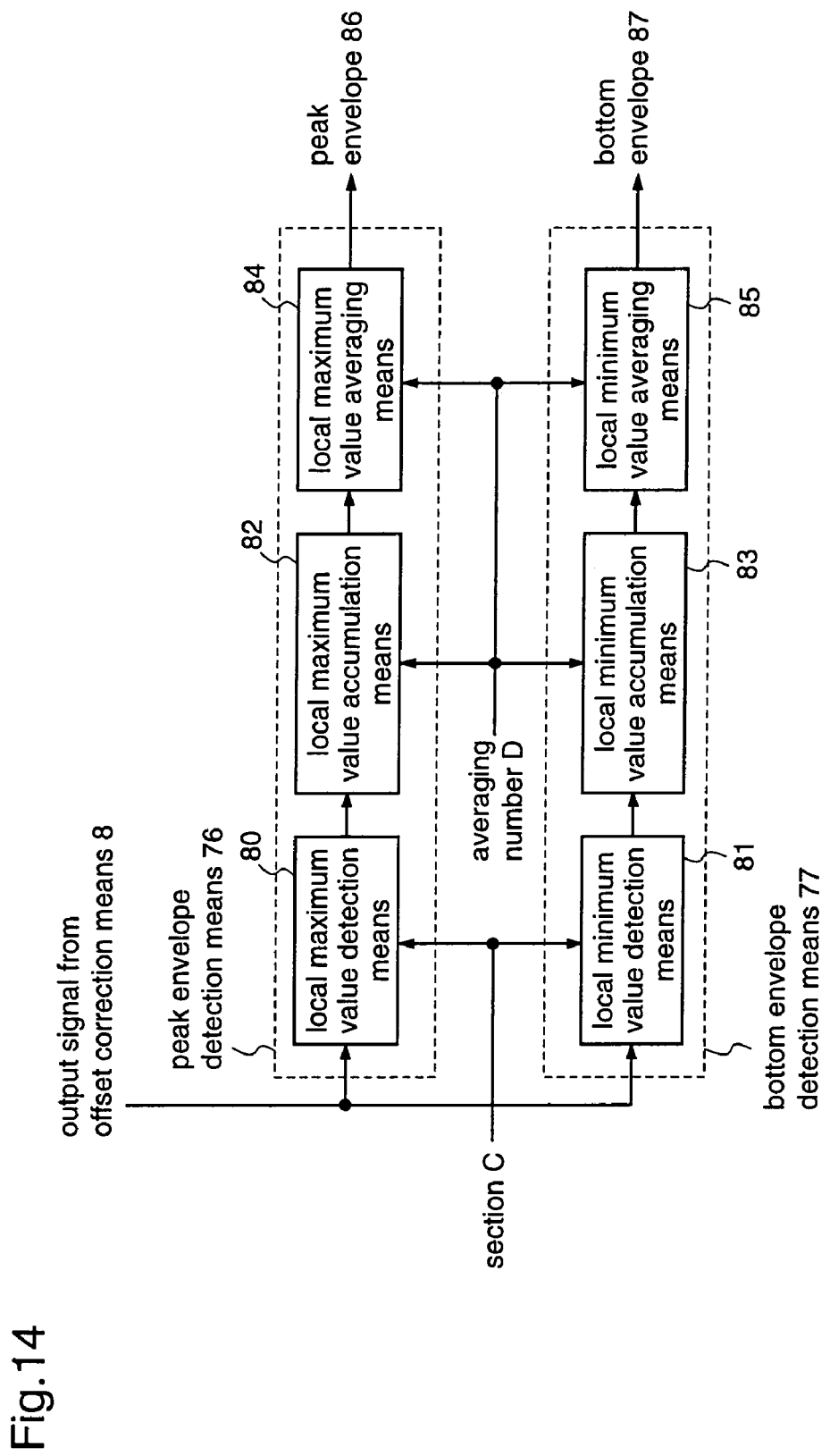
FIG. 14 is a block diagram illustrating a structure of a peak envelope detection means 76 and a bottom envelope detection means 77 according to the fourth embodiment.

FIG. 14 shows examples of circuit structures of the peak envelope detection means 76 and the bottom envelope detection means 77. Hereinafter, the operations of these circuits will be described, but these circuits are exemplary only and the present invention is not limited to these circuits.

In FIG. 14, the output signal from the offset correction means 8 is inputted to the peak envelope detection means 76 and the bottom envelope detection means 77, and the maximum value and the minimum value of the reproduction signal in arbitrary C (C is a positive integer) pieces of sampling sections of the output signal from the offset correction means 8 are detected by a local maximum value detection means 80 and a local minimum value detection means 81. Next, the output signals of the local maximum value detection means 80 and the output signals of the local minimum value detection means 81 in the above period are accumulated successively by D times (D is a positive integer) by using a local maximum value accumulation means 82 and a local minimum value accumulation means 83, respectively. Thereafter, the output signal from the local maximum value accumulation means 82 and the output signal from the local minimum value accumulation means 83 are averaged by D using a local maximum value averaging means 84 and a local minimum value averaging means 85, respectively. With the above-mentioned structure, it is possible to detect the average peak envelope 86 and the average bottom envelope 87 even when there are noises or low-band variations.

Figure 15:
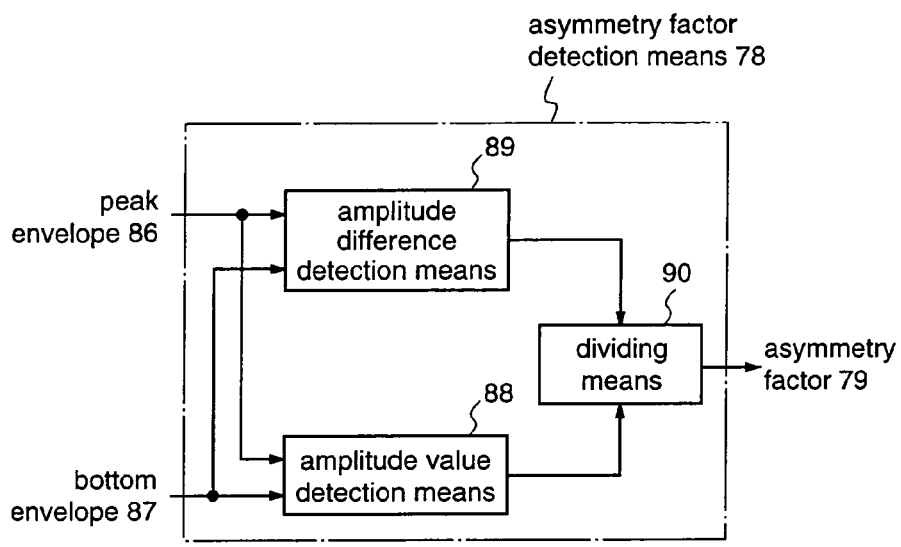
FIG. 15 is a block diagram illustrating a structure of an asymmetry factor detection means 78 according to the fourth embodiment.

FIG. 15 shows a circuit structure of the asymmetry factor detection means 78 as an example. Hereinafter, the operation of this circuit will be described, while this circuit is only exemplary and the present invention is not limited to this.

As shown in FIG. 15, the asymmetry factor detection means 78 receives, as input signals, the peak envelope 86 that is the output signal from the peak envelope detection means 76 and the bottom envelope 87 that is the output signal from the bottom envelope detection means 77 as shown in FIG. 14, and detect an average amplitude value of the reproduction signal from a difference between the peak envelope 86 and the bottom envelope 87, using an amplitude value detection means 88. Simultaneously, the peak envelope 86 and the bottom envelope 87 are added by an amplitude difference detection means 89, thereby to detect a difference between the upper amplitude value and the lower amplitude value of the reproduction signal. Thereafter, the output value of the amplitude difference detection means 89 is divided by the output value of the amplitude value detection means 88 using a dividing means 90, thereby detecting the asymmetry factor 79. This holds because the zero level of the output signal from the offset correction means 8 corresponds to the center of the code due to the code center control. The way to obtain the asymmetry factor 79 is expressed by a following formula.

Asymmetry factor 79=X/Y where X=(peak envelope 86−bottom envelope 87)
Y=(peak envelope 86+bottom envelope 87)

By controlling the digital data demodulation selection means 18 in consideration both of the asymmetry factor 79, and the mark distortion factor 17 as described in any of the first to third embodiments, it is possible to provide an optimum reproduction quality also corresponding to the asymmetry characteristics. For example, when the asymmetry factor 79 is larger than an arbitrary value E (E is an arbitrary numeric value) or the mark distortion factor 17 is larger than an arbitrary value F (F is an arbitrary numeric value), the digital data demodulation selection means 18 selects the level judge binarization means 12, and in other cases the selection means 18 selects the PRML signal processing means 13.

Also with respect to the control of the threshold values of the maximum likelihood decoding means 15 as described in the second embodiment, it is possible to perform an optimum threshold control by combining the threshold control information 67B that is generated from the peak envelope 86 and the bottom envelope 87, and the asymmetry information such as the asymmetry factor 79 as described in the fourth embodiment, and the threshold control information 67A as described in any of the first to third embodiments, whereby it is possible to implement the optimum PRML signal processing method also corresponding to the asymmetry characteristics. Similarly, the effect of the correction means 72 for a mark pattern of a long recording width in cases where the mark distortion factor 17 is extremely large as described in the third embodiment is made larger by considering the above-mentioned asymmetry information.

Further, the peak envelope detection means 76 for detecting a peak envelope of the output signal from the offset correction means 8 and the bottom envelope detecting means 77 for detecting a bottom envelope of the output signal from the offset correction means 8 are further provided, thereby making the digital data demodulation selection means 18 decide the means for demodulating the digital data using not only the mark distortion factor but also the peak envelope value detected by the peak envelope detection means 76 and the bottom envelope value detected by the bottom envelope detection means 77 as judgement criteria. Accordingly, it is possible to improve the mark-distortion resistant property of the PRML signal processing method at a time of selecting the optimum data demodulation means on the basis of the mark distortion factor.

Further, it is also possible that the maximum likelihood decoding means 15 sets the maximum likelihood decoding threshold level for estimating a sequence in the maximum likelihood decoding means 15, at a level at which the demodulation data are not erroneously demodulated, according to the output value of the peak envelope detection means 76, the output value of the bottom envelope detection means 77, and the mark distortion factor. Accordingly, the range and purpose in which the PRML signal processing method is effective is enlarged by optimizing the control parameter of the PRML signal processing method according to the mark distortion factor, whereby it becomes possible to implement the optimum PRML signal processing method in consideration of also the asymmetry characteristics, and thus it is possible to obtain a stable and satisfactory reproduction quality even when the jitter, waveform distortion, SNR, or the like is deteriorated because of the high-speed recording.

Further, the maximum likelihood decoding means 15 can correct the maximum likelihood decoding threshold level for a sequence that is judged by the mark width identifying flag generation means 38 as a pattern of a long mark width, according to the output value from the peak envelope detection means 76, the output value from the bottom envelope detection means 77, and the mark distortion factor, whereby it is possible to perform the optimum threshold control and accordingly implement the optimum PRML signal processing method in consideration of also the asymmetry characteristics.

Further, it is also possible that the long-mark portion demodulation data judging means 68 compares the digital binary signal that has been demodulated in accordance with the setting of the maximum likelihood decoding threshold level depending on the mark distortion factor and the digital binary signal that has been demodulated by the level judge binarization means with each other, as well as compares the output value from the peak envelope detection means 76 and the output value from the bottom envelope detection means 77 with each other, and judges a ratio of matching between the demodulation data in a long mark, thereby to decide the optimum value of the maximum likelihood decoding threshold level so that these demodulation data match the most. Since in this case the range and the purpose in which the PRML signal processing method is effective can be enlarged by optimizing the control parameter of the PRML signal processing method, the demodulation performance of the PRML signal processing means can be improved, whereby it is possible to obtain a stable and satisfactory reproduction quality even when jitter, waveform distortion, SNR, or the like is deteriorated because of the high-speed recording.

Further, the maximum likelihood decoding means 15 can correct the maximum likelihood decoding threshold level for a sequence that is judged by the mark width identifying flag generation means 38 as a pattern of a long mark width, according to the output value from the peak envelope detection means 76, the output value from the bottom envelope detection means 77, and the mark distortion factor, whereby it is possible to perform the optimum threshold control, and accordingly implement the optimum PRML signal processing method in consideration also of the asymmetry characteristics.

As described above, according to the fourth embodiment, the asymmetry information such as the asymmetry factor 79, the peak envelope 86, and the bottom envelope 87 is used as the judgement criterion of the demodulation method at a time of demodulating the digital data, and is also used for the optimization of the PRML signal processing and the correction of the mark pattern having a long recording width, whereby the applicable effective range of the PRML signal processing method is enlarged, and accordingly it is possible to improve the stable and satisfactory reproduction quality even in the case of demodulating digital data from an optical disc medium 1 in which a nonlinear distortion in the phase direction due to noises or tilt, the mark distortion resulting from the imperfect mark shape at the recording time, and vertical asymmetry in the reproduction signal (asymmetry) are simultaneously included.

Since it is possible to correctly grasp the quality of data which are recorded on the recording-type optical disc medium by utilizing the feature that the mark distortion factor and the asymmetry factor can be accurately detected, this embodiment can be applied not only to check the recording quality in the case of storing important information but also to check the recording quality of a recording-type optical disc drive or an optical disc recorder. As a result, this embodiment is effective in reduction of a period required for developing the associated products and assurance of the performance. Accordingly, it is possible to commercialize good-quality products, which are associated with the recording-type optical discs.

The invention according to any of the first to fourth embodiments is applied to the optical disc recording/playback apparatus, while this can be applied to reproduction systems such as a reproduction-only optical disc device or a magnetic disc device.

Further, two types of binary signals are obtained by the PRML method and the level judging method, while it is possible to obtain a binary signal by a method other than the level judging method.

As described above, the optical disc device according to the present invention can select one of the PRML signal processing method and the level judging method as the means for demodulating data according to the mark distortion factor depending on the recording state of a medium, and is effective in cases where a stable reproduction quality is required, without being affected by a recording medium as a reading target. Further, when the means for demodulating data is selected also according to the asymmetry factor, its effect is improved.

Further, the optical disc device of the present invention can grasp the recording state of a medium according to the mark distortion factor, and can be applied for purposes of examining or checking the recording state. This is especially useful for cases where important data are stored, and the like. Further, its effect is improved by selecting the means for demodulating data also according to the asymmetry factor.

Since the optical disc device of the present invention can set the width of a mark to be detected and the averaging number when detecting a mark distortion factor that is deeply associated with the recording condition, this device can correctly grasp the recording performance of the recording-type optical disc drive or the optical disc recorder, and this is useful for reduction of the time period that is required for developing the products and commercialization of the recording-type optical disc products that can ensure the stable performance. Further, this effect is improved by selecting the means for demodulating the data also according to the asymmetry factor.

Further, the optical disc device according to the present invention can optimize the metric operation in the maximum likelihood decoding according to the mark distortion factor depending on the recording state of a medium to improve the reading performance of the PRML signal processing method, and this is useful for cases where a high reproduction quality is needed such as when the state of the recording medium as a reading target is deteriorated. This effect is improved by selecting the means for demodulating the data also according to the asymmetry factor.

Further, the optical disc device according to the present invention can detect a synchronous pattern of a long mark width with stability, and accordingly it is suitable for purposes in which the data reproduction must be performed at high speed and with stability regardless of the recording state of the medium.

What is claimed is:

1. An optical disc device comprising:
   a mark width identifying flag generation unit for generating a detection flag at a time when a predetermined mark width is detected in an optical reproduction signal that is reproduced from an optical recording medium on which data are digitally recorded according to a pattern of recording code in which probabilities of occurrence of marks and spaces are almost the same;
   a distortion factor measuring unit for measuring a factor of a mark distortion in a waveform occurring due to an imperfect mark shape, at a position identified by the detection flag that is outputted from the mark width identifying flag generation unit; and
   a partial response maximum likelihood (hereinafter, referred to as PRML) signal processing unit that is realized by a combination of a partial response equalization unit for performing a partial response equalization to the optical reproduction signal with reference to an intentional waveform interference that can reduce high frequency components which are included in the optical reproduction signal, and a maximum likelihood decoding unit for estimating a most likely sequence,
   said optical disc device setting a maximum likelihood decoding threshold level for estimating a sequence in the maximum likelihood decoding unit according to the mark distortion factor, at a level at which demodulation data are not erroneously demodulated, with respect to a sequence that is judged by the mark width identifying flag generation unit as a long mark pattern.

2. The optical disc device as defined in claim 1 wherein the maximum likelihood decoding threshold level for estimating a sequence in the maximum likelihood decoding unit is set at a level at which the demodulation data are not erroneously demodulated, according to the mark distortion factor.

3. The optical disc device as defined in claim 1 further including:
   a preamplifier for emphasizing an output amplitude of the optical reproduction signal that is reproduced from the optical recording medium;
   a waveform equalizer for emphasizing a predetermined frequency band of the emphasized signal;
   an A/D converter for sampling the waveform equalized signal using a reproduction clock that is synchronous with a channel bit frequency of the optical reproduction signal, thereby obtaining multi-bit digital data;
   a phase-locked loop unit for controlling an oscillation frequency of the reproduction clock to be in phase with clock components of the multi-bit digital data; and
   an offset correction unit for performing correction to reduce offset components in an amplitude direction of the multi-bit digital data, thereby setting a position where polarities of the recording codes are balanced at a zero level, wherein
   said distortion factor measuring unit includes:
   a zero-cross position detection unit for detecting a zero-cross position of the reproduction signal from an output signal of the offset correction unit;
   a zero-cross width detection unit for counting a time interval between the zero-cross positions on the basis of the reproduction clock;

a mark width identifying flag generation unit for generating a detection flag every arbitrary mark width;
a maximal value calculation unit for calculating a maximal value of absolute values in an amplitude direction, in a section that is identified by the mark width identifying flag generation unit; and
a minimal value calculation unit for calculating a minimal value of the absolute values in the amplitude direction, and
said distortion factor measuring unit measures the mark distortion factor on the basis of a difference or a ratio between the maximal value and the minimal value.

4. The optical disc device as defined in claim 3 wherein the minimal value calculation unit calculates the minimal value by detecting the minimum value in a predetermined section near a middle point between zero crosses, and
the maximal value calculation unit calculates the maximal value by detecting the maximum value in a predetermined section that is larger than the minimal value detection section.

5. The optical disc device as defined in claim 3 wherein the distortion factor measuring unit further includes:
a maximal value accumulation unit for accumulating outputs from the maximal value calculation unit in a predetermined measurement section;
a minimal value accumulation unit for accumulating outputs from the minimal value calculation unit in a predetermined measurement section;
an extreme-value averaging number calculation unit for counting a number N (N is a positive integer) of predetermined zero-cross widths which are detected on a mark side;
a maximal value averaging unit for averaging an output from the maximal value accumulation unit by using the detection number N; and
a minimal value averaging unit for averaging an output from the minimal value accumulation unit by using the detection number N.

6. The optical disc device as defined in claim 5 further including:
a detection stop flag generation unit for generating a detection stop flag at a time when the detection number N as an output signal from the extreme-value averaging number calculation unit has a value that is equal to M-th power of 2 (M is a positive integer) as a measurement target value, wherein
the maximal value averaging unit averages the output from the maximal value accumulation unit by using the M-th power of 2, and
the minimal value averaging unit averages the output from the minimal value accumulation unit by using the M-th power of 2.

7. The optical disc device as defined in claim 5 wherein the distortion factor measurement unit generates a detection error flag indicating a detection error when the number counted by the extreme-value averaging number calculation unit does not reach an averaging number as a target number due to that the mark distortion factor is high and the reproduction signal crosses a center level of the recording code in a central part of the mark, in a predetermined number of sequential data.

8. The optical disc device as defined in claim 3 wherein the distortion factor measurement unit includes:
a discrimination flag generation unit for generating a discrimination flag for each zero-cross width, on the basis of plural zero-cross widths which are detected by the zero-cross width detection unit; and
a mark distortion factor measurement unit for measuring a mark distortion factor dependent on the respective zero-cross width, by averaging the respective maximal and minimal values which are selected by the discrimination flag.

9. An optical disc device comprising:
a distortion factor measuring unit for measuring a factor of a mark distortion in a waveform occurring due to an imperfect mark shape, at a position identified by a mark width identifying flag generation unit which generates a detection flag every arbitrary mark width, with respect to an optical reproduction signal that is reproduced from an optical recording medium on which data are digitally recorded according to a pattern of recording code in which probabilities of occurrence of marks and spaces are almost the same;
a level judge binarization means for demodulating the digitally recorded data by discriminating the data between two values of "0" and "1" at an arbitrary level;
a partial response maximum likelihood (hereinafter, referred to as PRML) signal processing unit that is realized by a combination of a partial response equalization unit for performing a partial response equalization to the optical reproduction signal with reference to an intentional waveform interference that can reduce high frequency components which are included in the optical reproduction signal, and a maximum likelihood decoding unit for estimating a most likely sequence; and
a digital data demodulation selection unit for selecting the PRML signal processing unit when the mark distortion factor of a long mark is lower than a predetermined value, and selecting the level judge binarization unit when the mark distortion factor is higher than the predetermined value.

10. The optical disc device as defined in claim 9 further including:
a preamplifier for emphasizing an output amplitude of the optical reproduction signal that is reproduced from the optical recording medium;
a waveform equalizer for emphasizing a predetermined frequency band of the emphasized signal;
an A/D converter for sampling the waveform equalized signal using a reproduction clock that is synchronous with a channel bit frequency of the optical reproduction signal, thereby obtaining multi-bit digital data;
a phase-locked loop unit for controlling an oscillation frequency of the reproduction clock to be in phase with clock components of the multi-bit digital data; and
an offset correction unit for performing correction to reduce offset components in an amplitude direction of the multi-bit digital data, thereby setting a position where polarities of the recording codes are balanced at a zero level, wherein
the distortion factor measuring unit includes:
a zero-cross position detection unit for detecting a zero-cross position of the reproduction signal from an output signal of the offset correction unit;
a zero-cross width detection unit for counting a time interval between the zero-cross positions on the basis of a reproduction clock;
a mark width identifying flag generation unit for generating a detection flag every arbitrary mark width;
a maximal value calculation unit for calculating a maximal value of absolute values in an amplitude direction, in a section that is identified by the mark width identifying flag generation unit; and
a minimal value calculation unit for calculating a minimal value of the absolute values in the amplitude direction, and
the mark distortion factor is measured on the basis of a difference or a ratio between the maximal value and the minimal value.

11. The optical disc device as defined in claim 10 wherein the distortion factor measuring unit further includes:
a maximal value accumulation unit for accumulating outputs from the maximal value calculation unit in a predetermined measurement section;
a minimal value accumulation unit for accumulating outputs from the minimal value calculation unit in a predetermined measurement section;
an extreme-value averaging number calculation unit for counting a number N (N is a positive integer) of predetermined zero-cross widths which are detected on a mark side;
a maximal value averaging unit for averaging an output from the maximal value accumulation unit by using the detection number N; and
a minimal value averaging unit for averaging an output from the minimal value accumulation unit by using the detection number N.

12. The optical disc device as defined in claim 11 wherein the distortion factor measuring unit generates a detection error flag indicating a detection error when a count number that is counted by a extreme-value averaging number calculation unit does not reach an averaging number due to that a mark distortion factor is high and the reproduction signal crosses a center level of the recording code in a central part of the mark, in a predetermined number of sequential data.

13. The optical disc device as defined in claim 9 wherein the digital data demodulation unit has a predetermined distortion factor A (A is a positive integer), and a predetermined distortion factor B (B is a positive integer) which is higher than the distortion factor A, as judgement criteria, and
said digital data demodulation unit selects the PRML signal processing unit and sets a maximum likelihood decoding threshold level of the PRML signal processing unit based on the partial response equalization level when the mark distortion factor is lower than the distortion factor A;
selects the PRML signal processing unit and sets the maximum likelihood decoding threshold level of the PRML signal processing unit at a value that is near a center level of the recording code when the mark distortion factor is higher than the distortion factor A and lower than the distortion factor B; and
selects the level judge binarization unit when the mark distortion factor is higher than the distortion factor B.

14. The optical disc device as defined in claim 9 further including:
a long-mark portion demodulation data judging unit for comparing a digital binary signal that is demodulated in accordance with the setting of a maximum likelihood decoding threshold level depending on the mark distortion factor and a digital binary signal that is demodulated by the level judge binarization unit with each other, and judging a ratio of matching between these digital binary signals in a mark having a long recording width, wherein
an optimum value of a maximum likelihood decoding threshold level of the maximum likelihood decoding unit is decided so that the digital binary signals match the most.

15. The optical disc device as defined in claim 9 further including:
a virtual zero-cross width detection unit for adding, to a sequence for which a result of counting of a zero-cross width on a mark side is 1T (T is a temporal width of a recording channel bit), zero-cross widths which are immediately forward and backward of the zero-cross width; and
a long-mark correction unit for replacing a result of the demodulation with a sequence of a long mark in a case where an output signal from the virtual zero-cross width detection unit coincides with a length of a pattern in which a mark distortion factor is high, wherein
said digital data demodulation selection unit judges whether to select the PRML signal processing unit or the level judge binarization unit in accordance with the detection error flag, in a case of reproducing the digitally recorded data which are recorded using a recording code that has a run length of 2 or longer, and selects an output signal that is obtained by applying the virtual zero-cross width detection unit and the long-mark correction unit to the output from the level judge binarization unit when the mark distortion factor is too high.

16. The optical disc device as defined in claim 9 further including:
a preamplifier for emphasizing an output amplitude of an optical reproduction signal that is reproduced from the optical recording medium;
a waveform equalizer for emphasizing a predetermined frequency band of the emphasized signal;
an A/D converter for sampling the waveform equalized signal using a reproduction clock that is synchronous with a channel bit frequency of the optical reproduction signal, thereby obtaining a multi-bit digital data;
a phase-locked loop unit for controlling an oscillation frequency of the reproduction clock to be in phase with clock components of the multi-bit digital data;
an offset correction unit for performing correction to reduce offset components in an amplitude direction of the multi-bit digital data, thereby setting a position where polarities of the recording codes are balanced at a zero level;
a peak envelope detection unit for detecting a peak envelope of an output signal from the offset correction unit; and
a bottom envelope detection unit for detecting a bottom envelope of the output signal from the offset correction unit, wherein
said digital data demodulation selection unit decides whether to select the PRML signal processing unit or the level judge binarization unit for demodulation of digital data, using the mark distortion factor, and further the peak envelope value that is detected by the peak envelope detection unit and the bottom envelope value that is detected by the bottom envelope detection unit, as judgement criteria.

17. The optical disc device as defined in claim 16 wherein the peak envelope detection unit includes:
a local maximum value detection unit for detecting a maximum value of output signals from the offset correction unit in predetermined C pieces of sampling sections (C is a positive integer);

a local maximum value accumulation unit for accumulating output signals from the local maximum value detection unit in a period during which said local maximum value detection is successively repeated by D times (D is a positive integer); and a local maximum value averaging unit for averaging an output signal from the local maximum value accumulation unit by using the D value.

18. The optical disc device as defined in claim 16 wherein the bottom envelope detection unit includes:

a local minimum value detection unit for detecting a minimum value of output signals from the offset correction unit in predetermined C pieces of sampling sections (C is a positive integer);

a local minimum value accumulation unit for accumulating output signals from the local minimum value detection unit in a period during which said local minimum value detection is successively repeated by D times (D is a positive integer); and a local minimum value averaging unit for averaging an output signal from the local minimum value accumulation unit by using the D value.

19. The optical disc device as defined in claim 16 further including an asymmetry factor detection unit for detecting an asymmetry factor of an optical reproduction signal on the basis of output signals from the peak envelope detection unit and the bottom envelope detection unit, wherein said digital data demodulation unit selects the level judge binarization unit when the symmetry factor that is detected by the asymmetry factor detection unit is large or when a mark distortion factor that is measured by the distortion factor measuring unit is large, while selecting the PRML signal processing unit in other cases.

20. The optical disc device as defined in claim 19 wherein said asymmetry factor detection unit includes: an amplitude value detection unit for calculating a difference between the output value from the peak envelope detection unit and the output value from the bottom envelope detection unit; and an amplitude difference detection unit for adding the output value from the peak envelope detection unit and the output value from the bottom envelope detection unit, and said asymmetry factor detection unit calculates the asymmetry factor by dividing an output value from the amplitude difference detection unit by an output value from the amplitude value detection unit.

21. The optical disc device as defined in claim 16 wherein said maximum likelihood decoding unit sets the maximum likelihood decoding threshold level for estimating a sequence in the maximum likelihood decoding unit at a level at which the demodulation data are not erroneously demodulated, in accordance with an output value from the peak envelope detection unit, an output value from the bottom envelope detection unit, and the mark distortion factor.

22. The optical disc device as defined in claim 21 wherein said maximum likelihood decoding unit corrects the maximum likelihood decoding threshold level for a sequence which is judged as a pattern of a long mark width by the mark width identifying flag generation unit, in accordance with the output value from the peak envelope detection unit, the output value from the bottom envelope detection unit, and the mark distortion factor.

23. The optical disc device as defined in claim 16 including:

a long-mark portion demodulation data judging unit for comparing the digital binary signal that is demodulated in accordance with the setting of the maximum likelihood decoding threshold level depending on an output value from the peak envelope detection unit, an output value from the bottom envelope detection unit, and the mark distortion factor, and the digital binary signal that is demodulated by the level judge binarization signal with each other, thereby judging a ratio of matching between the demodulation data in a long mark, wherein an optimum value of the maximum likelihood decoding threshold level is decided so that the demodulation data match the most.

* * * * *